(12) United States Patent  
Tucker et al.

(10) Patent No.: US 9,769,192 B2  
(45) Date of Patent: Sep. 19, 2017

(54) SECURITY EVALUATION SYSTEMS AND METHODS

(71) Applicant: Temporal Defense Systems, LLC, Renton, WA (US)

(72) Inventors: Mark Tucker, Kirkland, WA (US); Charles Elden, Dunnellon, FL (US); Jared Karro, Charlotte, NC (US)

(73) Assignee: TEMPORAL DEFENSE SYSTEMS, LLC, Renton, WA (US)

( * ) Notice: Subject to any disclaimer, the term of this patent is extended or adjusted under 35 U.S.C. 154(b) by 84 days.

(21) Appl. No.: 14/634,562

(22) Filed: Feb. 27, 2015

(65) Prior Publication Data

US 2015/0249677 A1 Sep. 3, 2015

Related U.S. Application Data

(60) Provisional application No. 61/946,656, filed on Feb. 28, 2014.

(51) Int. Cl.  
*H04L 29/06* (2006.01)

(52) U.S. Cl.  
CPC .............. *H04L 63/1433* (2013.01)

(58) Field of Classification Search  
CPC .................................. H04L 63/1433  
USPC ............................................. 726/25  
See application file for complete search history.

(56) References Cited

U.S. PATENT DOCUMENTS

| | | | |
|---|---|---|---|
| 6,615,182 B1 | 9/2003 | Powers et al. | |
| 7,735,116 B1 | 6/2010 | Gauvin | |
| 8,516,597 B1 * | 8/2013 | Sharma | G06F 21/577 705/38 |
| 8,635,662 B2 | 1/2014 | Lang | |
| 8,667,589 B1 | 3/2014 | Saprygin et al. | |
| 8,819,769 B1 * | 8/2014 | van Dijk | H04L 63/0876 726/1 |
| 9,294,498 B1 * | 3/2016 | Yampolskiy | H04L 63/1433 |
| 2001/0039624 A1 | 11/2001 | Kellum | |
| 2002/0048369 A1 | 4/2002 | Ginter et al. | |
| 2004/0015724 A1 | 1/2004 | Pham et al. | |
| 2005/0102513 A1 | 5/2005 | Alve | |
| 2006/0064740 A1 * | 3/2006 | Kelley | G06F 21/577 726/3 |
| 2006/0117182 A1 | 6/2006 | Wolff | |
| 2006/0168202 A1 | 7/2006 | Reshef et al. | |
| 2006/0288420 A1 | 12/2006 | Mantripragada et al. | |
| 2008/0077703 A1 | 3/2008 | Lee | |
| 2008/0155649 A1 | 6/2008 | Maler et al. | |

(Continued)

OTHER PUBLICATIONS

International Search Report issued in International Patent Application No. PCT/US2015/018141 mailed Jun. 3, 2015.

(Continued)

*Primary Examiner* — Jacob Lipman  
(74) *Attorney, Agent, or Firm* — DLA Piper LLP US

(57) ABSTRACT

A system may be broken down into one or more components. Each of the components may be evaluated to ascribe a security score to each of the components. A composite security score may be generated for the system based on the security scores and a rate of decay measure characterizing a probabilistic security degradation of the system. The rate of decay measure may be applied to the composite security score to obtain a current composite security score.

42 Claims, 24 Drawing Sheets

(56) References Cited

U.S. PATENT DOCUMENTS

| | | |
|---|---|---|
| 2009/0024663 A1 | 1/2009 | McGovern |
| 2009/0199264 A1 | 8/2009 | Lang |
| 2009/0228316 A1 | 9/2009 | Foley et al. |
| 2011/0154498 A1 | 6/2011 | Fissel et al. |
| 2011/0247081 A1 | 10/2011 | Shelton |
| 2012/0185910 A1* | 7/2012 | Miettinen ............... G06F 21/31 726/1 |
| 2013/0054018 A1 | 2/2013 | Holman et al. |
| 2013/0097696 A1 | 4/2013 | Baker |
| 2013/0145178 A1 | 6/2013 | Jeffries et al. |
| 2013/0191898 A1* | 7/2013 | Kraft ...................... G06F 21/31 726/6 |
| 2013/0291057 A1 | 10/2013 | Slyfield |
| 2014/0222866 A1 | 8/2014 | Joneja |
| 2014/0282895 A1 | 9/2014 | Stuntebeck |
| 2015/0264061 A1* | 9/2015 | Ibatullin ............... H04L 63/145 726/23 |
| 2016/0078247 A1 | 3/2016 | Tucker et al. |
| 2016/0149900 A1 | 5/2016 | Justin et al. |

OTHER PUBLICATIONS

Written Opinion of the International Searching Authority in International Patent Application No. PCT/US2015/018141 mailed Jun. 3, 2015.

International Search Report issued in International Patent Application No. PCT/US2015/060216 mailed Feb. 4, 2016.

Written Opinion of the International Searching Authority in International Patent Application No. PCT/US2015/060216 mailed Feb. 4, 2016.

International Search Report dated Jan. 29, 2016 issued in International Application No. PCT/US2015/060212.

Written Opinion dated Jan. 29, 2016 issued in International Application No. PCT/US2015/060212.

U.S. Appl. No. 14/855,196.

U.S. Appl. No. 14/938,683.

U.S. Appl. No. 14/938,683 (dated Apr. 17, 2017 to Jul. 17, 2017).

* cited by examiner

Base Security Score Certificate (BSSC)

Standard Certificate Fields:     700
Issued to
Serial Number
Issue Date
Expiration Date
...

Unique Certificate Fields:
Rate of Decay
Security Category #1
    Security Object Score #1
    Security Object Score #2
    ...
    Security Object Score #M Security Category #M
    Security Object Score #1
    Security Object Score #2
    ...
    Security Object Score #M

FIG. 6

SECURITY EVALUATION SYSTEMS AND METHODS

CROSS-REFERENCE TO RELATED APPLICATION

This disclosure claims priority from U.S. Provisional Application No. 61/946,656, entitled "Common Security Measurement Method," filed Feb. 28, 2014, the entirety of which is incorporated by reference herein.

BRIEF DESCRIPTION OF THE DRAWINGS

FIG. 6 is a base security score certificate according to an embodiment of the invention.

DETAILED DESCRIPTION OF SEVERAL EMBODIMENTS

Figure 1:
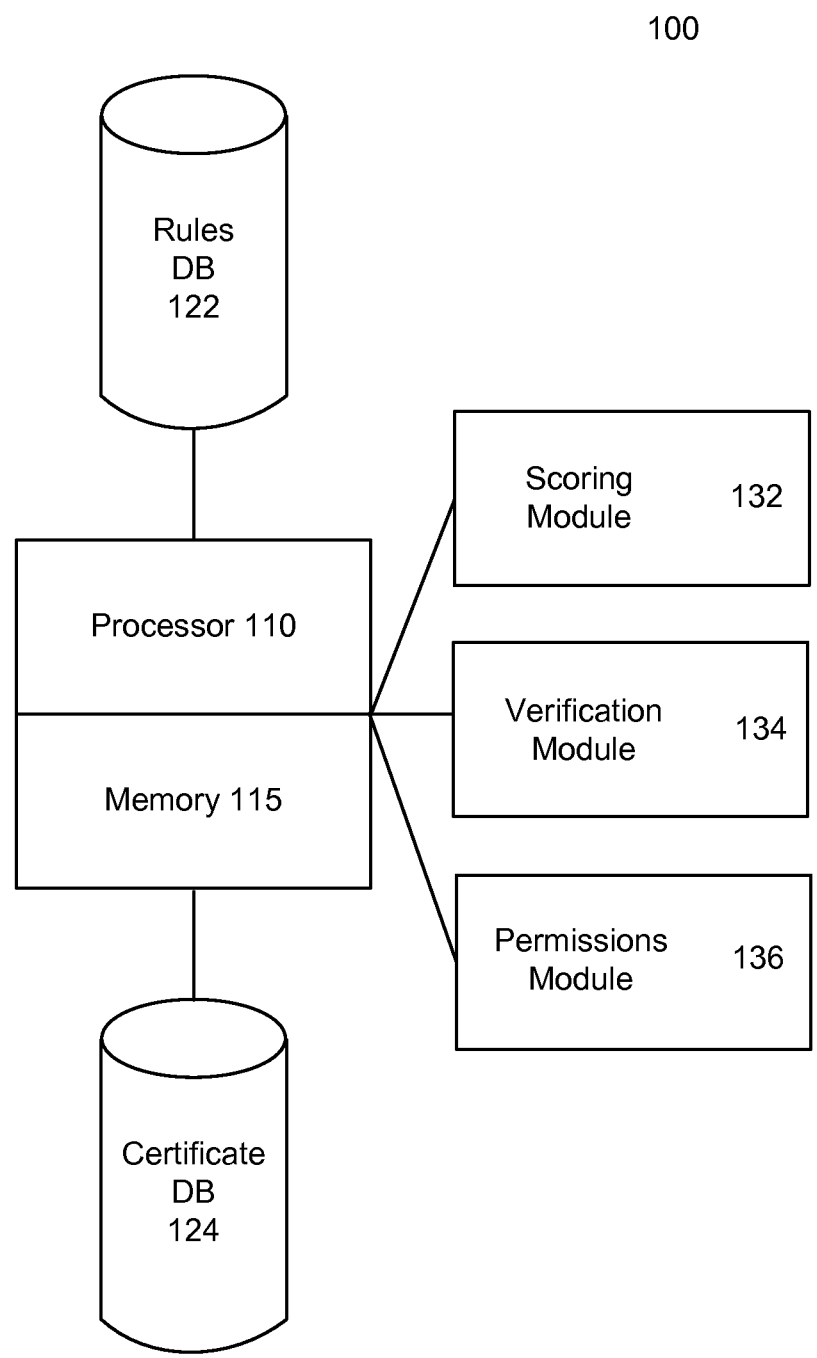
FIG. 1 is a security module according to an embodiment of the invention.

The systems and methods described herein may provide security evaluation for one or more systems based on a quantum security model (QSM). QSM is a security measurement and comparison methodology. QSM may provide a normalized methodology of breaking down a system and evaluating primitive components in a consistent manner, which may allow interdependencies to be more accurately understood and measured. QSM may provide a method to normalize the resultant evaluation of the primitive components to a quantifiable score. QSM may allow a resource owner to specify what evaluating (signing) authorities they recognize and accept. QSM methods may be used to evaluate both the current and probabilistic future security state of a system or device. QSM may allow individual resource owners to specify and verify an asset's security score prior to granting access. QSM may enable assets with computational ability to mutually authenticate each other prior to sharing resources or services.

In QSM, a common measurement may be reached through an evaluation process conducted on a device, system, or entity (the "asset") where an agreed upon, reproducible, independently verifiable security level determination is desired. A quantum security unit symbolized as ("qS") and pronounced ("qSec") may be a standard unit of measure for security of a system based on the QSM. A qSec may be a temporal value similar to the position of a particle in quantum physics such that it may only be estimated at best and best known at the moment a measurement is conducted by an observer. After measurement, the position of a particle may only be probabilistically determined with a degrading precision over time. A qSec, being a quantum measurement, may share this characteristic. It may be postulated that systems may be viewed as wave-like systems from the perspective of security and the principles of quantum mechanics can be applied. The security of a system is a property of that system. The passage of time, along with the normal functioning and operation of the system and its environment may all affect the security of a system. As a result, the security of a system may be dynamic and the known state of the security may be transient by nature. Therefore, systems may be represented as wave-like systems and system security as a quantum property. Similar to the position of a particle, the security of a system may be quantifiably defined using quantum mechanical principles for measurement. The measurement results may provide a security measure represented in quantum security units, where a value of zero represents the complete lack of any security in a system, and increasing values indicate higher security.

The value that one qSec represents may be derived from criteria to be evaluated during the system security measurement process. Each criteria may have a common value range related to their impact to security. Also, each criteria may have an associated evaluation process that produces a result within that range. A criteria weighting method may be applied to each criteria, and the common value range may become a security value scale for what a quantum security measurement represents as denoted in qSecs. For example, the qSec value may represent an eigenvalue in matrix mechanics. Different observers at different periods of time may theoretically interpret this value differently depending on their perspective and may desire to apply their own probabilistic filters to a qSec value or conduct their own measurement process to determine the qSec value of a system. Thus, the value may be predetermined in order to utilize qSec measurement in a meaningful way when classifying system security. The predetermination may be done automatically, may be set by a user, and/or may be set at or before system initialization.

Systems and methods described herein may comprise one or more computers, which may also be referred to as processors. A computer may be any programmable machine or machines capable of performing arithmetic and/or logical operations. In some embodiments, computers may comprise processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as servers, PCs, mobile devices, routers, switches, data centers, distributed computers, and other terms. Computers may facilitate communications between users and/or other computers, may provide databases, may perform analysis and/or transformation of data, and/or perform other functions. It will be understood by those of ordinary skill that those terms used herein are interchangeable, and any computer capable of performing the described functions may be used. Computers may be linked to one another via a network or networks. A network may be any plurality of completely or partially interconnected computers wherein some or all of the computers are able to communicate with one another. It will be understood by those of ordinary skill that connections between computers may be wired in some cases (e.g., via Ethernet, coaxial, optical, or other wired connection) or may be wireless (e.g., via Wi-Fi, WiMax, or other wireless connections). Connections between computers may use any protocols, including connection-oriented protocols such as TCP or connectionless protocols such as UDP. Any connection through which at least two computers may exchange data can be the basis of a network.

FIG. 1 is a security module 100 according to an embodiment of the invention. The security module 100 may include a processor 110 and physical memory 115, for example a rules database 122 and/or a certificate database 124. The rules database 122 may store various access control rules as described in greater detail below. The certificate database 124 may store various certificates for devices, documents, users, etc., as described in greater detail below. The security module 100 may also include sub-modules such as a scoring module 132 which may derive and/or update security scores, a verification module 134 which may determine whether security rules are met, and/or a permissions module 136 which may automatically or manually define security rules and/or access permissions. Note that any device described herein as performing security validations or as a QSM enabled device or QSM device may include a security module 100 and may use the security module 100 to perform the validations and/or other processes related to QSM as described.

Figure 2:
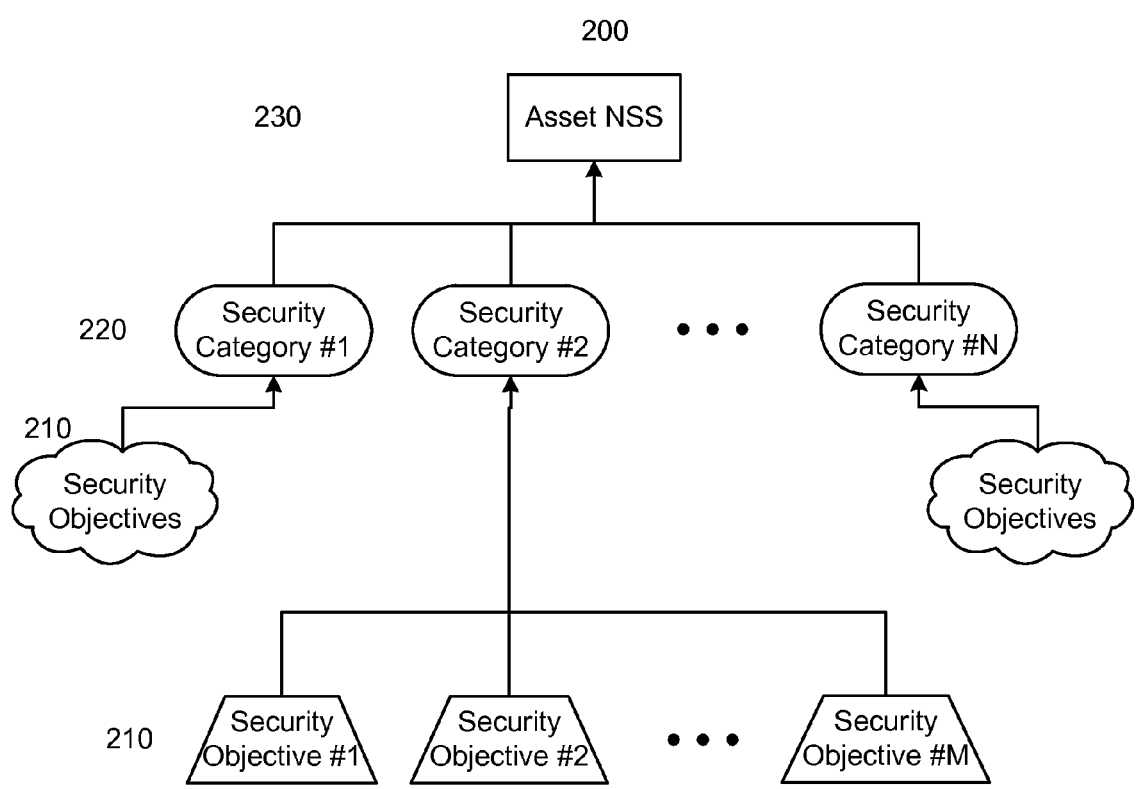
FIG. 2 is a security score derivation according to an embodiment of the invention.
Figure 3:
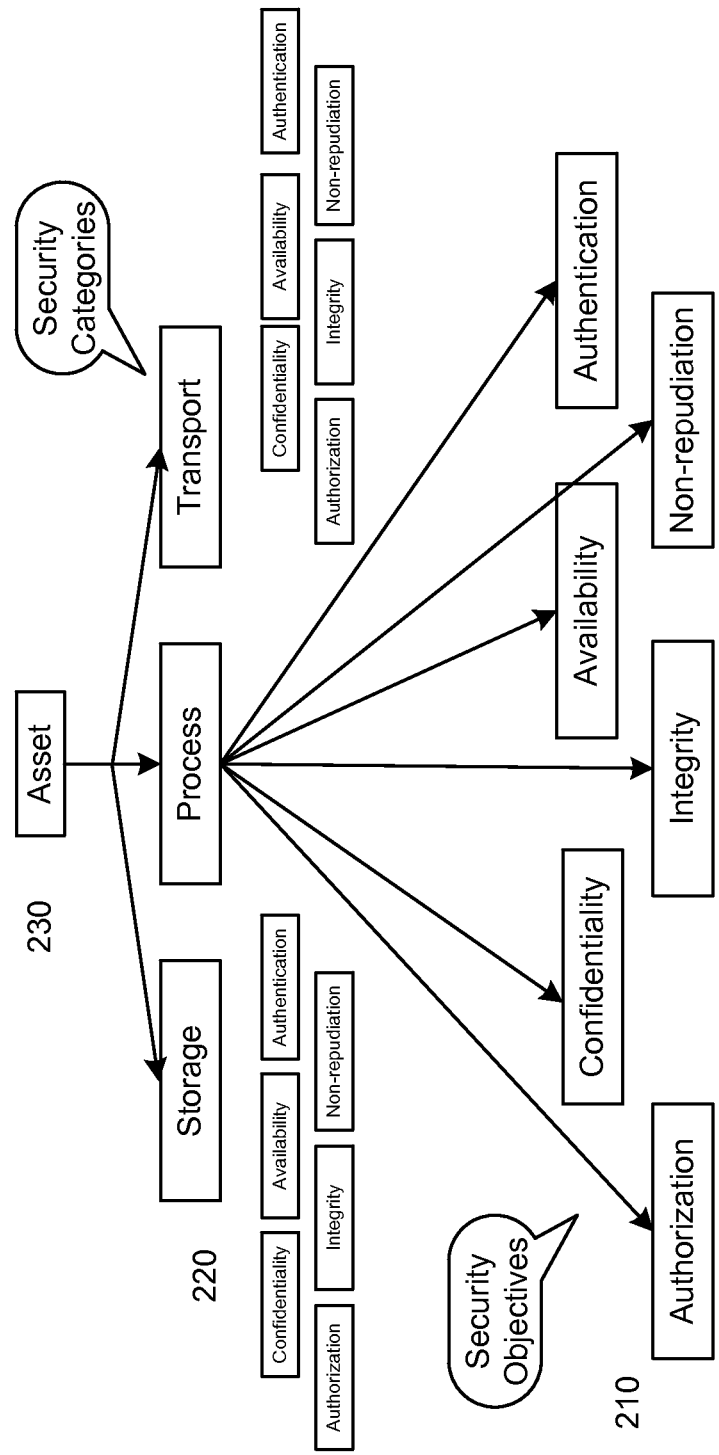
FIG. 3 is an asset according to an embodiment of the invention.

FIG. 2 is a security score derivation 200 according to an embodiment of the invention. An evaluation process may be conducted on an asset to determine its security level. To achieve this result, a normalized security score representing the security level of the asset may be generated at the conclusion of the evaluation. The score may be normalized through a process that applies a predetermined set of security criteria ("security objectives") 210 against the asset's primary functions (what it does, its purpose) isolated by predefined grouping ("security category") 220 for assessment purposes. For each security objective 210, an assessment may be conducted on each of the asset's security categories, and a security score may be generated (the "objective score") that falls within a range assigned to the security objective. A degree of importance for each score may vary from asset to asset or even instance to instance. When all of the objective scores have been generated, they may be combined using a predefined objective score aggregation method (e.g., a weighted average), resulting in a normalized security score ("NSS") 230. FIG. 3 is an asset 230 according to an embodiment of the invention, showing specific examples of security categories 220 and security objectives 210 that may be used in some embodiments. For example, an asset 230 may have storage, process, and transport security categories 220, which may correspond to primary functions performed by the asset 230 (e.g., data storage, data processing, and data transport). Each of the security categories 220 may have authorization (AZ), confidentiality (C), integrity (I), availability (AV), non-repudiation (NR), and authentication (AI) security objectives 210. An NSS for the asset 230 may provide an indication of how well the asset 230 meets the security objectives 210 overall, based on how well each of the functional categories associated with the security categories 220 score on the security objectives 210.

Figure 4:
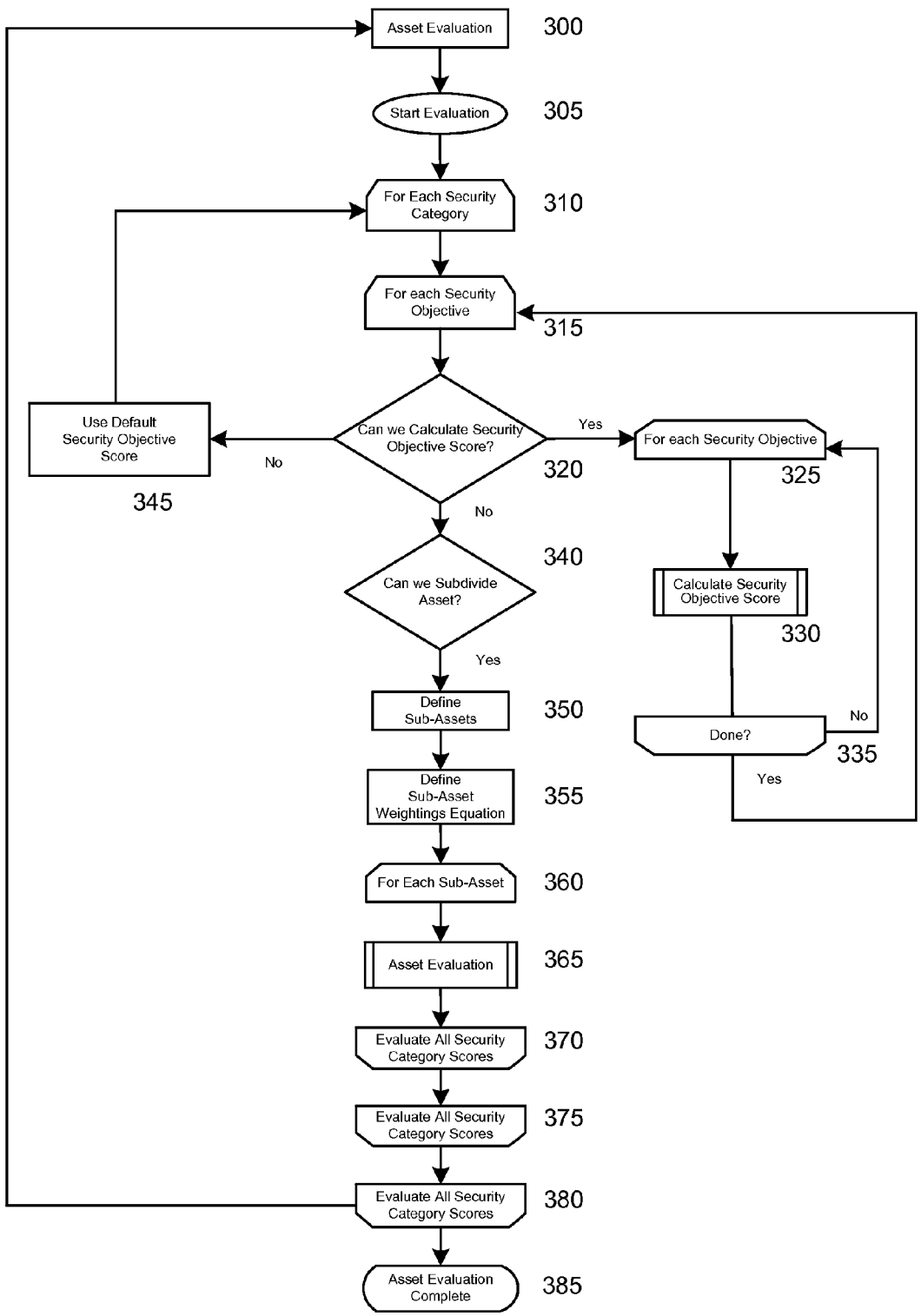
FIG. 4 is an asset evaluation according to an embodiment of the invention.

FIG. 4 is an asset evaluation 300 according to an embodiment of the invention.

Some assets may be complex (e.g., made up of many subcomponents). For these complex assets, a measuring technique such as the technique 300 of FIG. 4 may be conducted on each subcomponent independently to derive an NSS value for each subcomponent. These subcomponent values may be combined to produce the highest order asset's NSS. An asset may be chosen for evaluation, and evaluation may begin 305. One or more security categories 220 may be identified, and each security category 220 may be evaluated 310. Each security category 220 may include one or more security objectives 210, and each security objective 210 may be evaluated 315. The security module 100 may determine whether a security objective score can be calculated 320 for the security objective 210. If so, the security objective score calculation may begin 325, and its security objective score may be generated 330. Examples of security objective score calculations are discussed in greater detail below. When the score has been calculated 335, the next security objective 210 may be selected 315. If a security objective score cannot be calculated 320 for the security objective 210, the security module 100 may determine whether the asset should be subdivided 340. Some assets may be too complex to derive the security objective scores directly, or may comprise components, devices, and/or systems that have been previously evaluated. To accommodate these situations, assets may be sub-divided.

Figure 5A:
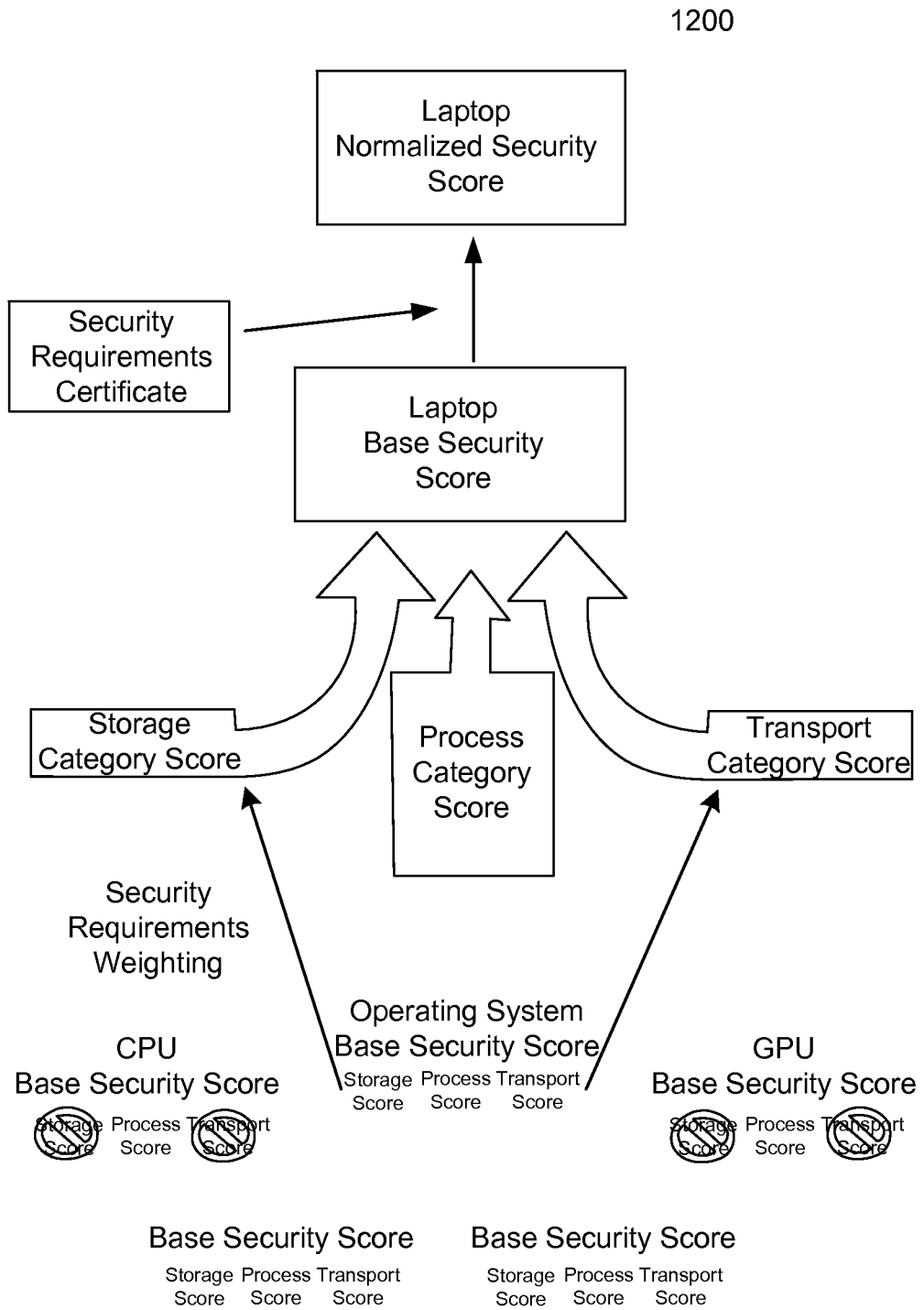
FIGS. 5A-5D are asset subdivisions according to embodiments of the invention.
Figure 5B:
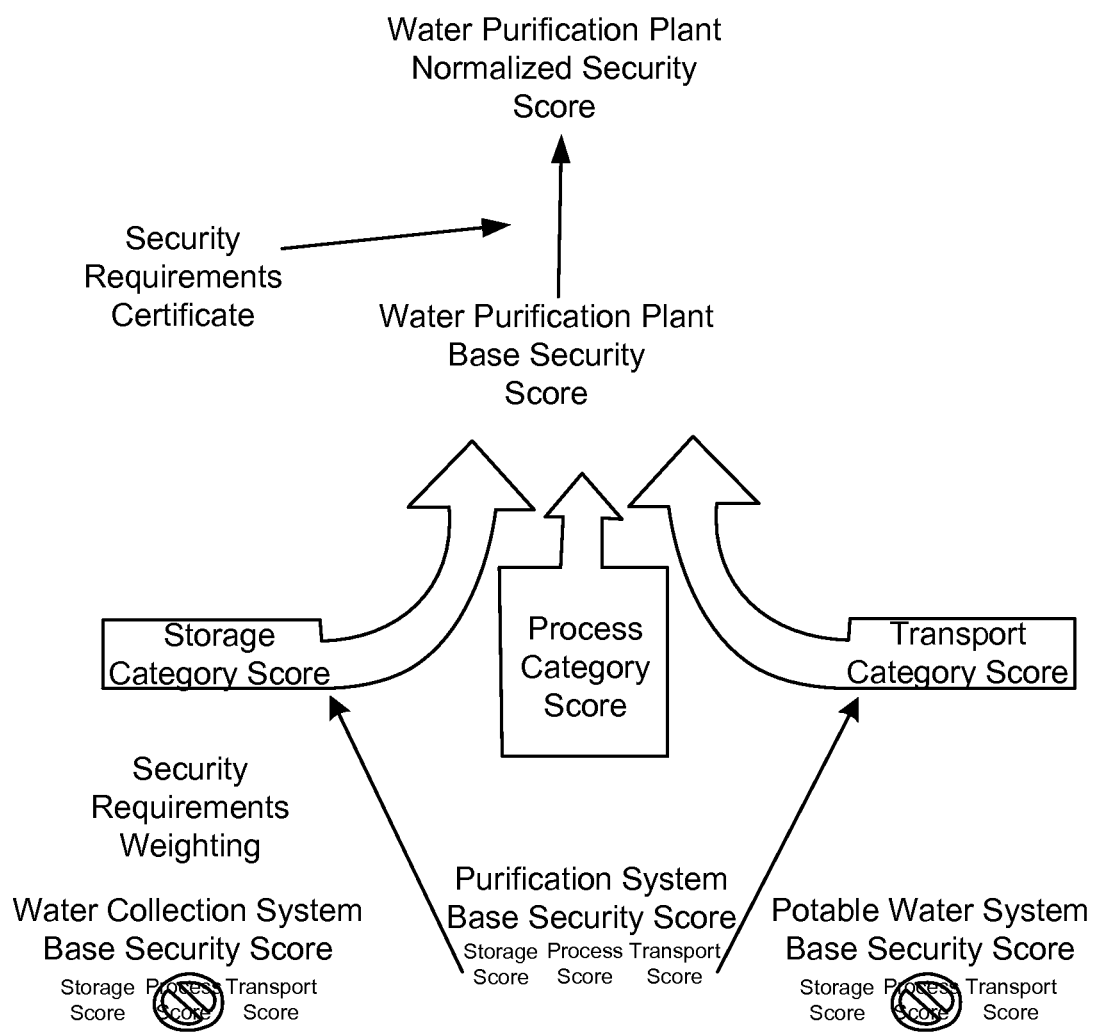
Figure 5C:
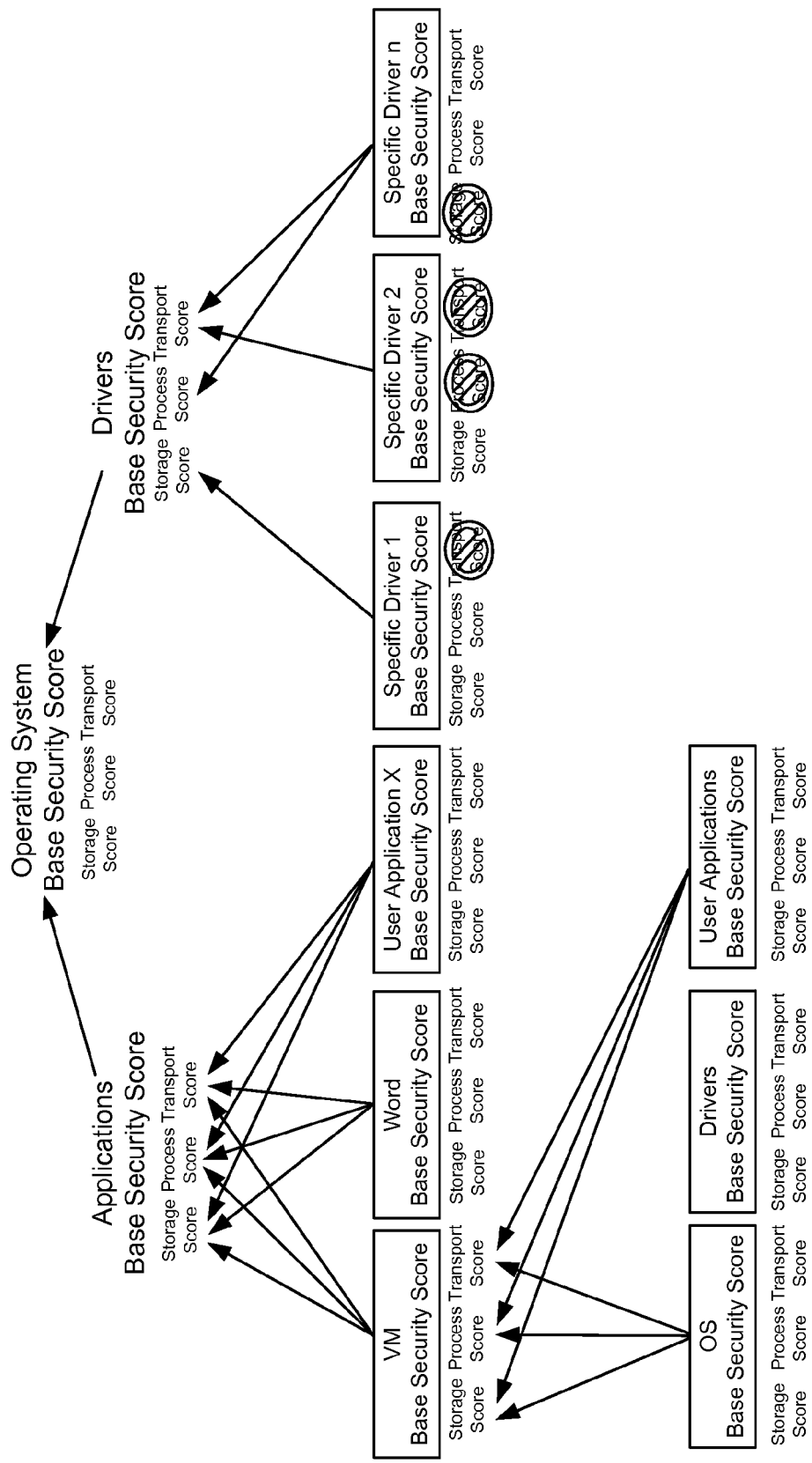
Figure 5D:
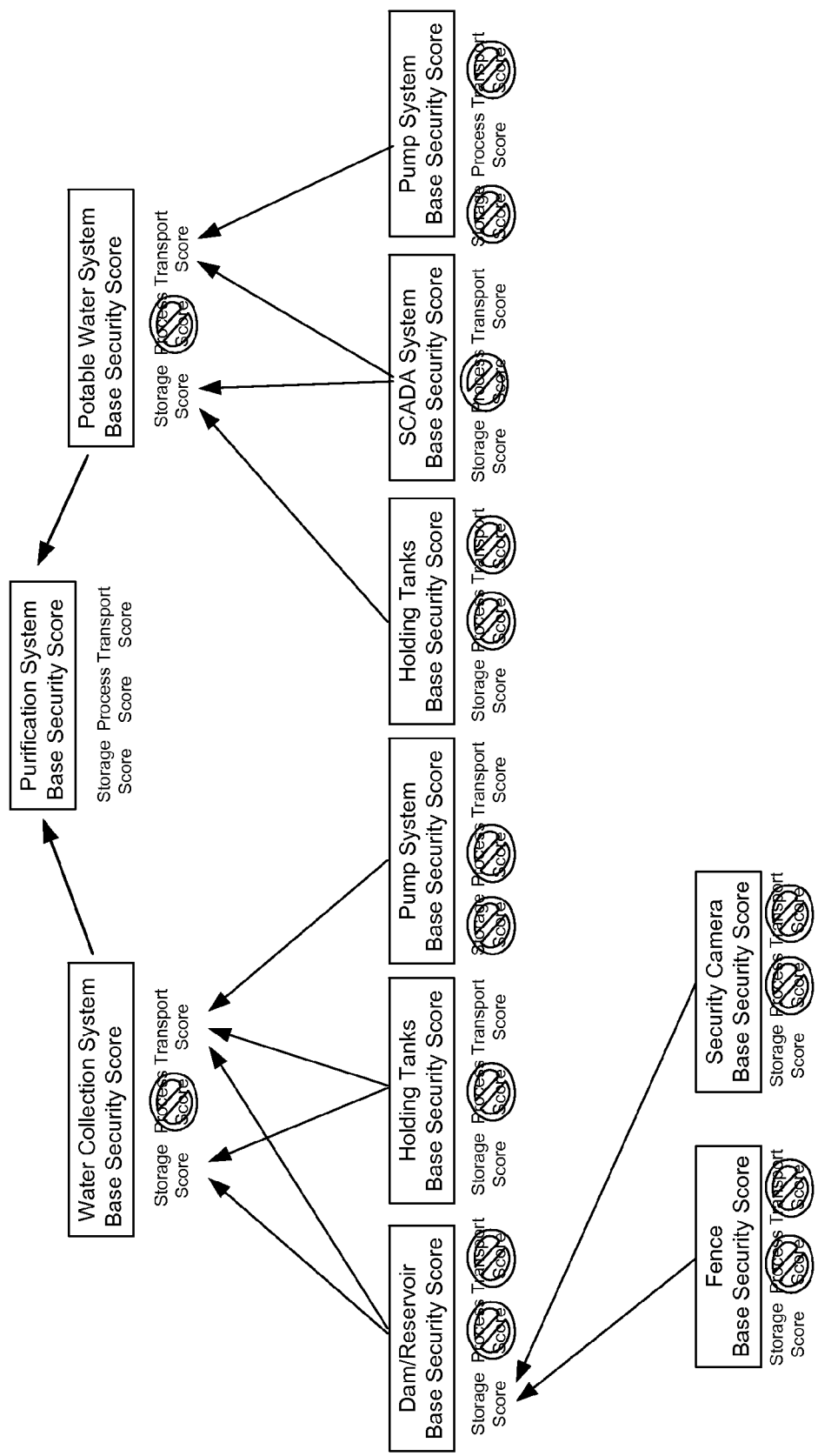

FIGS. 5A-5D are asset subdivision examples 1700 and 1750 according to embodiments of the invention. FIG. 5A depicts this principle using a laptop as an example, wherein the laptop is divided into CPU, operating system, and GPU components. FIG. 5B depicts a water purification plant as another example, wherein the plant is divided into water collection system, purification system, and potable water system components. As shown, it may be possible for some sub-assets to only contribute to a single security category score, while others may contribute to multiple security categories. FIG. 5C shows how the laptop sub-assets from FIG. 5A may be broken down further into specific drivers under the drivers sub-asset and specific applications under the application sub-asset. In the illustration, the Virtual Machine (VM) sub-asset of the applications sub-asset is further broken down to the applications running under the VM. This process may be repeated as necessary until every sub-asset may be accurately evaluated. FIG. 5D shows the further breakdown of the water purification sub-assets of the pre-purification sub-asset from FIG. 5B, demonstrating that QSM may be applicable to any critical infrastructure component or asset requiring evaluation regardless of the type of asset. A knowledgeable person in the area to which the asset belongs may follow this methodology and recursively break any complex system down to further sub-assets until the system consists of primitives (sub-assets to which an evaluation can or has been performed). In the water plant example these may be sub-assets like fences, guards, and locks whose impact on physical security may be well documented and may be quantified.

Referring back to FIG. 4, if no subdivision is possible, a default security objective score may be assigned 345, and the evaluation 300 may move on to the next security objective 315. If subdivision is to be done 340, the security module 100 may define sub-assets 350 and sub-asset weightings equations 355. As noted above, sub-assets may be further divided themselves, in which case analysis may be performed on the further divided sub-assets. For each sub-asset 360, an asset evaluation 365 may be performed, and a security objective score 370 may be generated. All security objective scores may be evaluated 375, and security category scores may be evaluated 380. If there are more security categories 220 to evaluate, the next security category 220 may be selected 310, and the evaluation described above may be performed for the security objectives 210 of the next security category 220. When all security categories 220 have been evaluated, the asset evaluation may end 385. For the asset 230 of FIG. 3, with three security categories 220 each having six security objectives 210, a total of eighteen evaluations may be performed.

Figure 7:
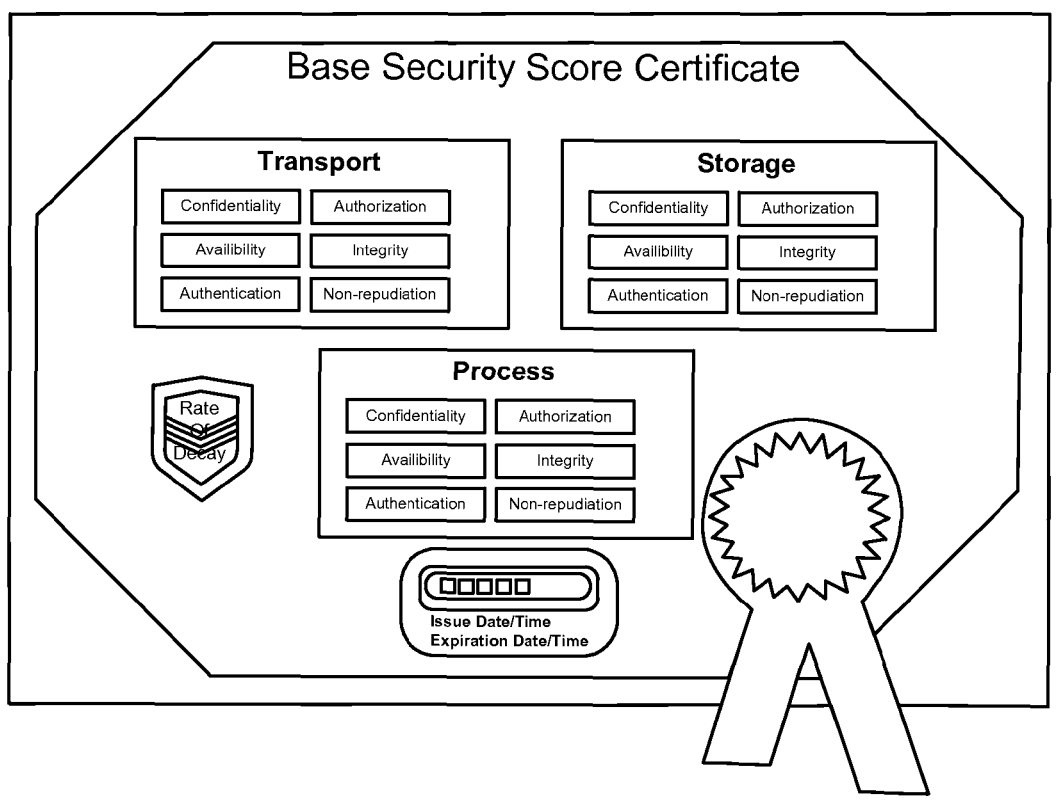
FIG. 7 is a base security score certificate according to an embodiment of the invention.

Utilizing NSS, objective score sets, and derived security rules along with cryptographic techniques such as public-private key certificates, digital assets may securely store their security level along with the time the evaluation of the asset was performed in a Base Security Score Certificate (BSSC). FIG. 6 is a BSSC 700 according to an embodiment of the invention. The BSSC 700 may include scores for each security objective 210 and category 220. For the example asset 230 of FIG. 3, the BSSC 700 may be a 3-tuple of security category 220 scores (SCS), each of which may in turn be a 6-tuple of security objective 210 scores. FIG. 7 is an example BSSC 700 for the asset 230 of FIG. 3. This example BSSC 700 may have a base security score (BSS) expressed as BSS=((Transport SCS), (Storage SCS), (Process SCS)) or BSS=(($T_C$, $T_I$, $T_{AZ}$, $T_{AI}$, $T_{AV}$, $T_{NR}$), ($S_C$, $S_I$, $S_{AZ}$, $S_{AI}$, $S_{AV}$, $S_{NR}$), ($P_C$, $P_I$, $P_{AZ}$, $P_{AI}$, $P_{AV}$, $P_{NR}$)), where C=confidentiality, I=integrity, AZ=authorization, AI=authentication, AV=availability, and NR=non-repudiation. The BSSC 700 may be signed by an individual, corporation, regulatory agency, or government agency, for example. The BSSC 700 may include a date/time the certificate was issued and a date/time the certificate will expire. The BSSC 700 may also include a rate of decay for the NSS, which is described in greater detail below.

To take into account the transient nature of security, meaning security may have a high probability of degrading post measurement, a security rate of decay (ROD) algorithm may be used to factor in probabilistic security degradation that has occurred since the last NSS evaluation noted in the BSSC was conducted. The ROD may be used to determine a realistic security score for a system given the time that has passed since a BSSC was initially issued. The algorithm for calculating the ROD may be dependent upon the metrics chosen for scoring the system. By using the NSS and objective score sets as inputs along with the time of the last evaluation (and optionally other security rules or recorded asset usage history), a new NSS score may be calculated and used for more accurate common security comparisons.

Figure 8:
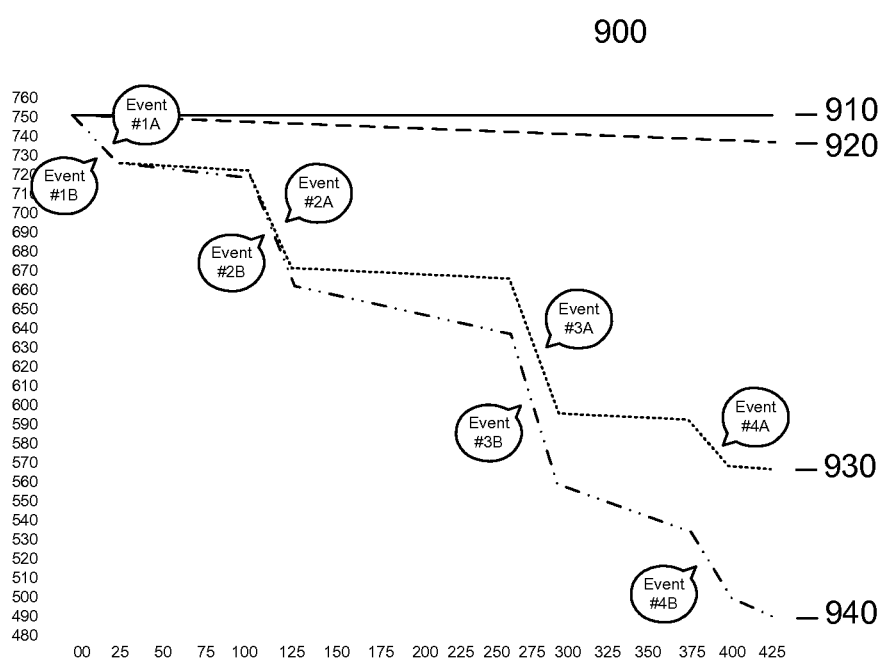
FIG. 8 is a security score degradation according to an embodiment of the invention.

FIG. 8 is a security score degradation 900 according to an embodiment of the invention. Line 910 shows a security for a system without a ROD value which remains constant over time. However, the longer a system runs the more likely it may be for the system to become compromised. This decrease in security is shown by line 920, which shows a linear ROD of 0.01 per unit of time. Lines 930 and 940 show the security of a system over time while taking into account events, which may negatively impact the security of the system. Line 930 represents four security events which decrease the security of the system but do not cause a change in the ROD. Line 940 depicts the same four events but assumes each of these events also alters the ROD value. The events depicted in FIG. 8 may be the result of connecting a USB device to the system, connecting the system, to an untrusted network, browsing to a malicious website, or installing a downloaded application, for example.

In order to allow assets to maintain a history of significant events, the QSM may support the concept of certificate chains, or Security Score Chain (SSC). The BSSC may provide a base certificate in any SSC. The asset can modify the score and sign a new certificate with the BSSC, thereby creating the SSC. When creating an SSC, the asset may include a record of why the modification is being made. In FIG. 8, after each event on line 930 or 940, an update to the SSC may be made reflecting the change to the ROD and documenting the events that caused these changes. If the BSSC is given a ROD, the new security score may adjust for any decay (e.g., as shown in line 940) since the new certificate in the chain will have a new issue date/time. The expiration date/time may not be extended past the expiration of the BSSC, but may be shortened if appropriate. In addition, if appropriate, the ROD may be modified to reflect new risks and threats.

Figure 9:
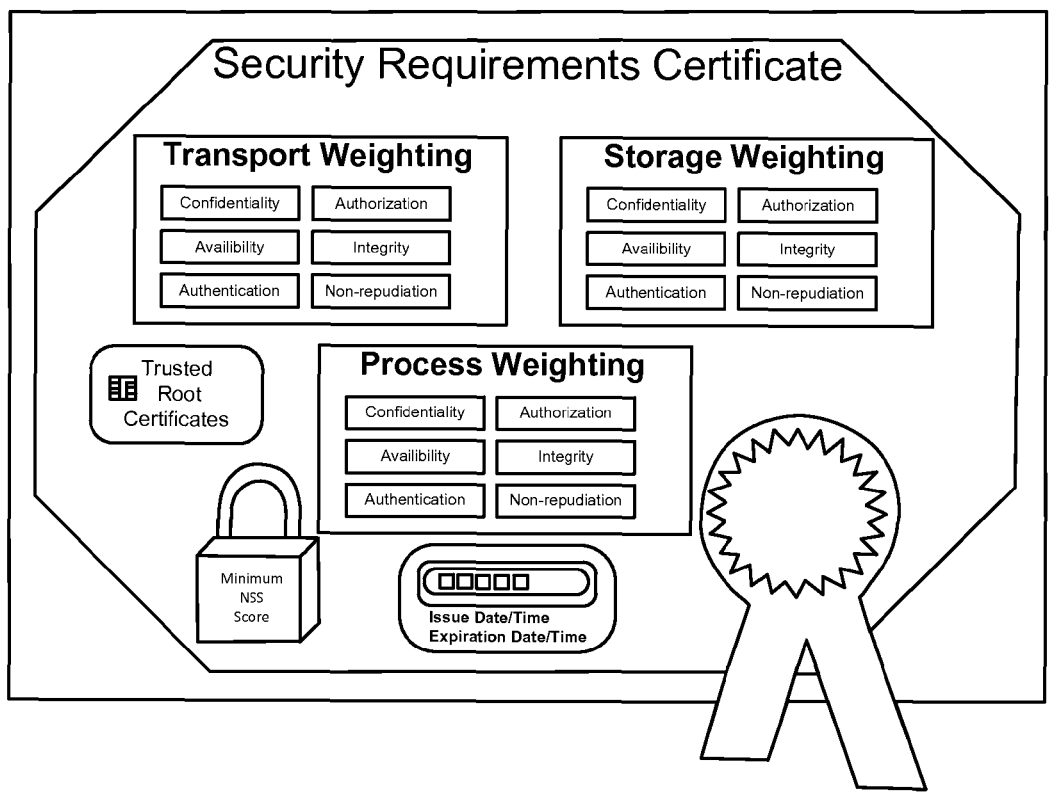
FIG. 9 is a security requirements certificate according to an embodiment of the invention.

FIG. 9 is a security requirements certificate (SRC) 1400 according to an embodiment of the invention. The SRC, like a BSSC, may be a cryptographically secured, signed document containing security requirement weightings (SRW) for each of the security objective 210 scores (SOS), the security weightings for each of the security objectives 210, the authorized BSSC and SSC signatories, and/or a minimum Normalized Security Score (NSS). The NSS may be the highest-level score in the QSM and may be calculated by applying the security requirement weightings in the security requirements certificate to the security objective scores in the base security score. Mathematically, the SRW may be similar to the BSSC (e.g., a 3-tuple of Security Category Weightings (SCW) (which may be the percentage weighting each of the categories contribute to the NSS), with each SCW being a 6-tuple value of security objective weightings (SOW) (which is the percentage weighting attributed to each of the SOS values). For example, an SRW may can be represented as: SRW=(Transport SCW(Transport SOW), Storage SCW(Storage SOW), Process SCW(Process SOW)) or SRW=(SCW($T_C$, $T_I$, $T_{AZ}$, $T_{AI}$, $T_{AV}$, $T_{NR}$), SCW($S_C$, $S_I$, $S_{AZ}$, $S_{AI}$, $S_{AV}$, $S_{NR}$), SCW($P_C$, $P_I$, $P_{AZ}$, $P_{AI}$, $P_{AV}$, $P_{NR}$)), for the example of FIGS. 3 and 7.

The NSS may provide a metric that can be used to evaluate the security posture of a given asset over time ($\Delta T$). This score may be used to authenticate the asset, authorize access, compare the security utility of assets, or determine where improvements should be made to a given asset, for example. A NSS may be calculated as follows: NSS= (BSS*SRW)−(ROD*$\Delta T$). Thus, a NSS for the example of FIGS. 3 and 7 may be NSS=($SCW_T$*($T_C$*$TW_C$+$T_I$*$TW_I$+$T_{AZ}$*$TW_{AZ}$+$T_{AI}$*$TW_{AI}$+$T_{AV}$*$TW_{AV}$+$T_{NR}$*$TW_{NR}$)+$SCW_S$* ($S_C$*$SW_C$+$S_I$*$SW_I$+$S_{AZ}$*$SW_{AZ}$+$S_{AI}$*$SW_{AI}$+$S_{AV}$*$SW_{AV}$+ $S_{NR}$*$SW_{NR}$)+$SCW_P$*($P_C$*$PW_C$+$P_I$*$PW_I$+$P_{AZ}$*$PW_{AZ}$+ $P_{AI}$*$PW_{AI}$+$P_{AV}$*$PW_{AV}$+$P_{NR}$*$PW_{NR}$))−(ROD*($T_{CURRENT}$− $T_{ISSUED}$))

Figure 10:
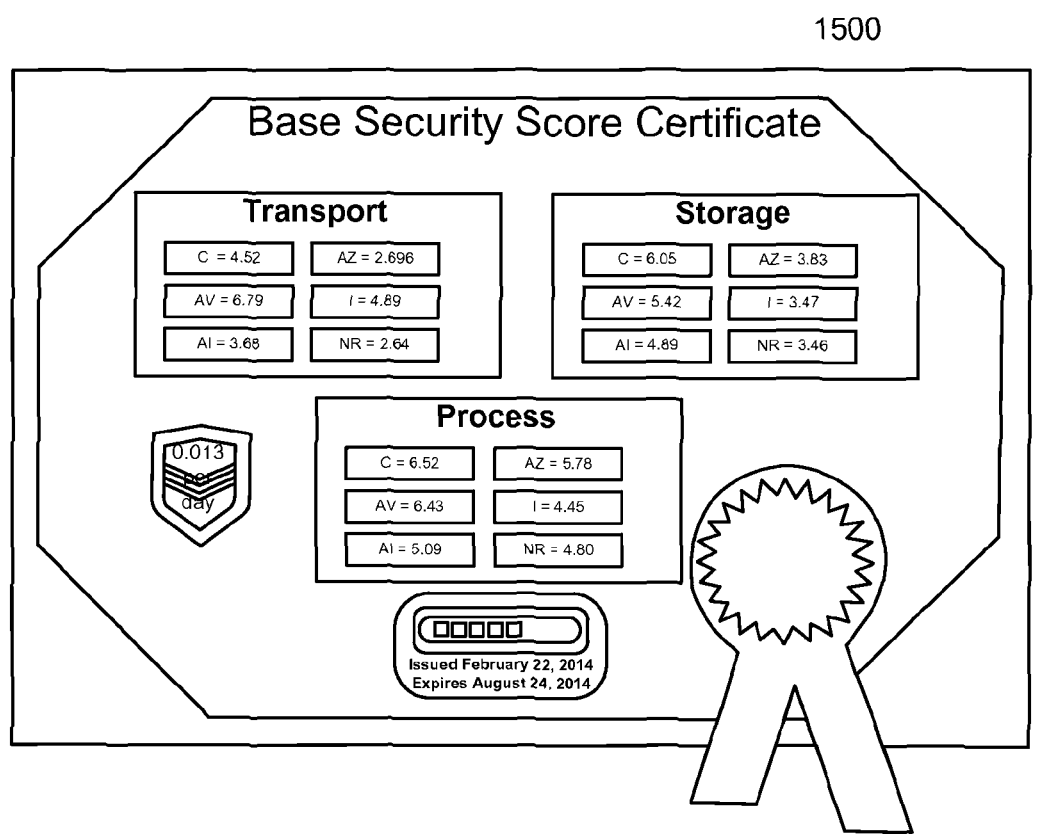
FIG. 10 is a base security score certificate according to an embodiment of the invention.
Figure 11:
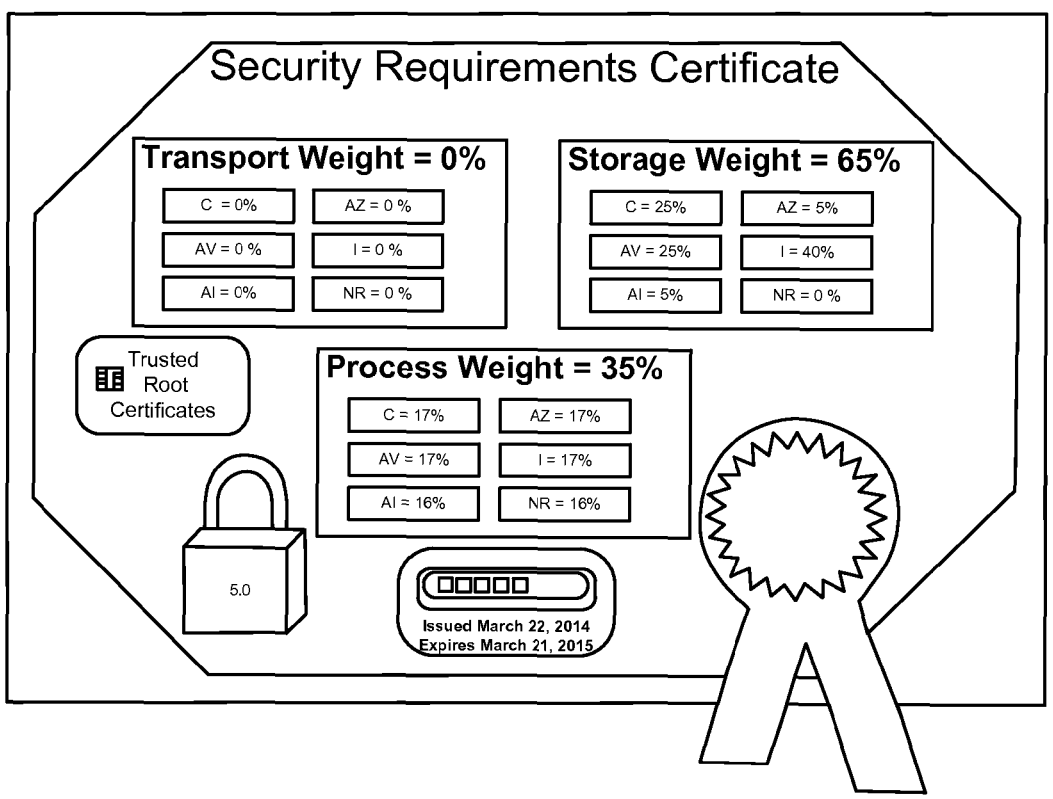
FIG. 11 is a security requirements certificate according to an embodiment of the invention.

FIG. 10 is a base security score certificate 1500 according to an embodiment of the invention. In this example, BSS= ((6.05, 3.47, 3.83, 4.89, 5.42, 3.46), (6.52, 4.45, 5.78, 5.09, 6.43, 4.80), (4.52, 4.89, 2.69, 3.68, 6.79, 2.64)). The ROD is 0.013/day, and the certificate was issued on 22 Feb. 2014 and has an expiration of 24 Aug. 2014. FIG. 11 is a security requirements certificate 1600 according to an embodiment of the invention. In this example, SRW=(0% (0%, 0%, 0%, 0%, 0%, 0%), 65% (25%, 40%, 5%, 5%, 25%, 0%), 35% (17%, 17%, 17%, 16%, 17%, 16%)). The 0.0 weighting in the transport security objective weighting shows that this particular asset owner does not care about or does not utilize transport activities. Such a scenario may exist for a stand-alone machine or a smartcard, which may not have any means of transporting data but does have storage and processing capabilities. The minimum required NSS listed in the SRC is 5.0 and the current date or TCURRENT=23 Mar. 2014. Below is the detailed calculation of the storage portion; the other detailed calculations are omitted:

Storage portion=0.65*(0.25*6.05+0.4*3.47+ 0.05*3.83+0.05*4.89+0.25*5.42+0.0*3.46)=3.05

NSS=(0+3.05+1.93)−(0.013*(23 Mar. 2014-22 Feb. 2014)=(4.98−(0.013*29))=4.6

This computed NSS may be compared against the stored min NSS value, if it is above the min NSS value, it may be approved. In the above example, since the calculated NSS of 4.6 is less than the SRC permits (5.0), the device would be rejected.

Figure 12:
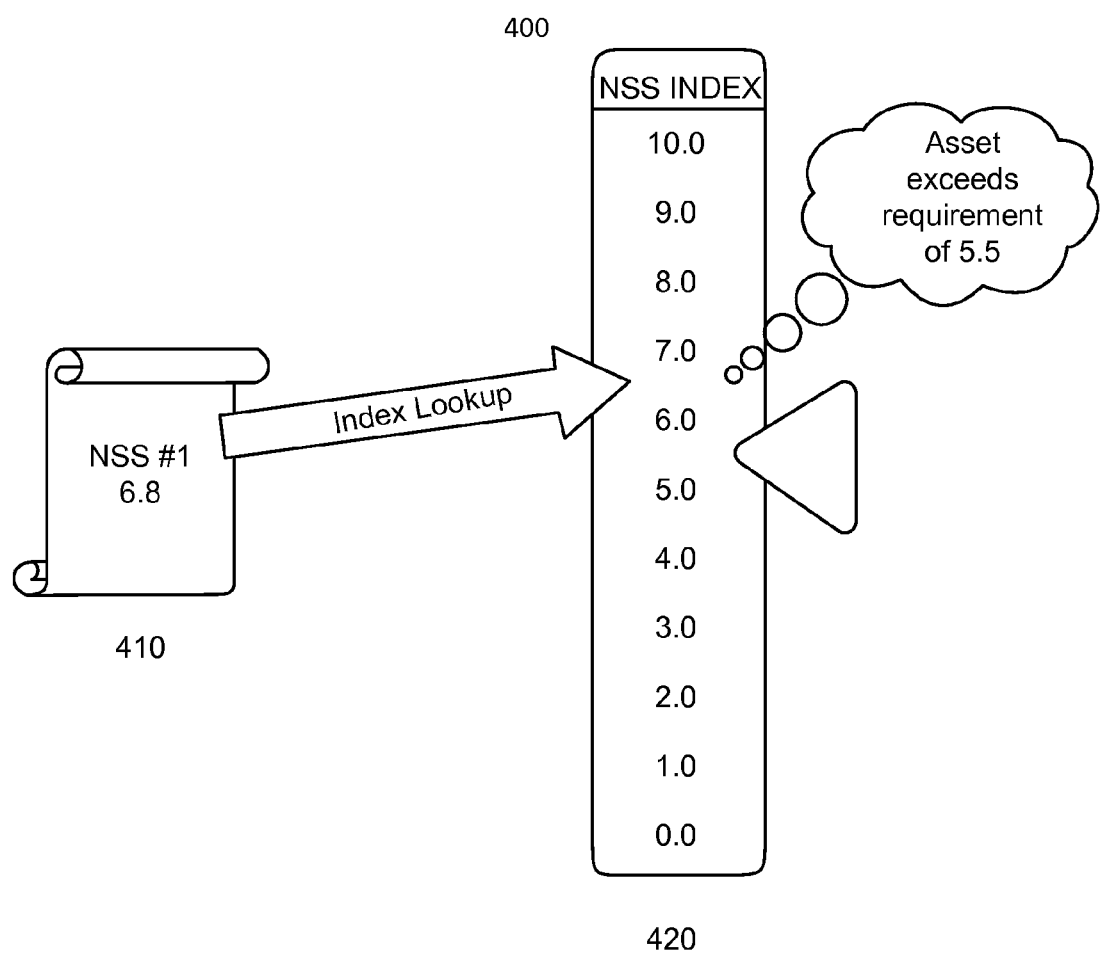
FIG. 12 is a normalized security score comparison according to an embodiment of the invention.
Figure 13:
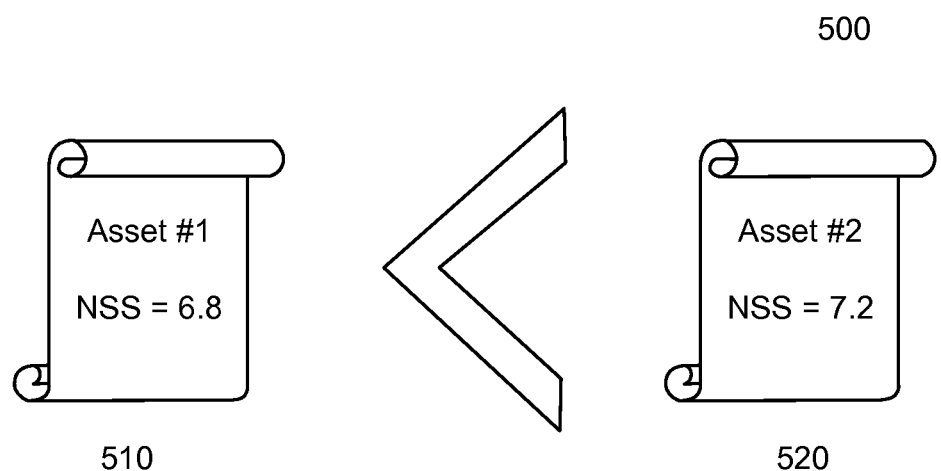
FIG. 13 is a normalized security score comparison according to an embodiment of the invention.

The NSS values may be compared and contrasted allowing a security level index to be applied to the security of an asset. FIG. 12 is an NSS comparison 400 according to an embodiment of the invention. An NSS value 410 may be compared to an NSS index 420 to determine whether the NSS for an asset indicates that the asset has a minimum required security level. For example, the NSS index 420 may indicate that an asset with a score of 5.5 or more has an acceptable security level, and an asset with a score less than 5.5. does not have an acceptable security level. In the example of FIG. 12, the asset has an NSS of 6.8 and thus exceeds the requirement of 5.5. Additionally, two or more assets may be compared to determine if they have the same or contrasting security levels, or to determine which of the assets are more secure. FIG. 13 is an NSS comparison 500 according to an embodiment of the invention. In this example, asset 1 has an NSS value 510 of 6.8, and asset 2 has an NSS value 520 of 7.2, so asset 2 may be regarded as more secure than asset 1. Based on agreed upon pre-determined security objectives and categories along with the pre-determined score aggregation processes and common security measure methods, transitivity may suggest that the security comparison is an agreed upon, reproducible, independently verifiable security comparison.

Figure 14:
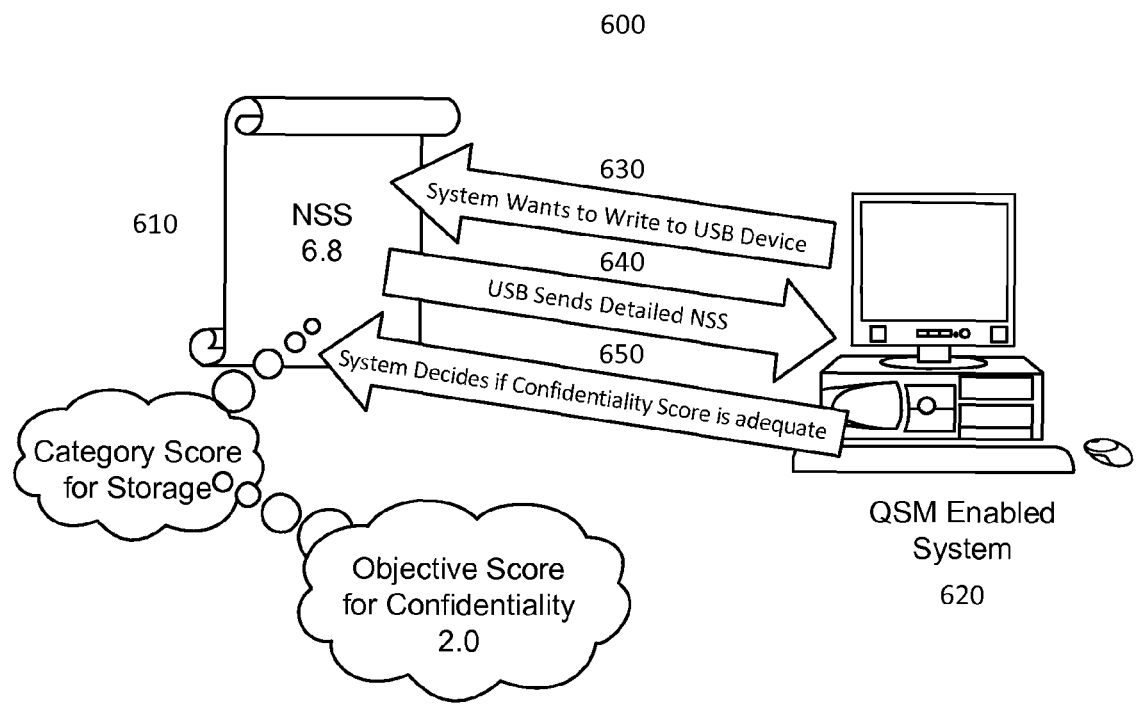
FIG. 14 is a security verification according to an embodiment of the invention.

Utilizing the NSS and the objective score set, extended security comparisons may be conducted that may commonly measure more specific security attributes of an asset. FIG. 14 is a security verification 600 according to an embodiment of the invention. An asset 610 (e.g., a USB device) may have a calculated NSS (e.g., 6.8). a QSM enabled system 620 may verify asset security 600 before interacting with the asset. The system 620 may be asked to perform an operation using the asset (e.g., a write operation to the USB device) 630, for example via user input. The asset 610 may send its NSS 640 to the system 620. The system 620 may evaluate the NSS (e.g., by performing a comparison as shown in FIG. 12). If the NSS evaluation indicates adequate security, the operation may proceed. If not, the operation may be prevented.

Figure 15:
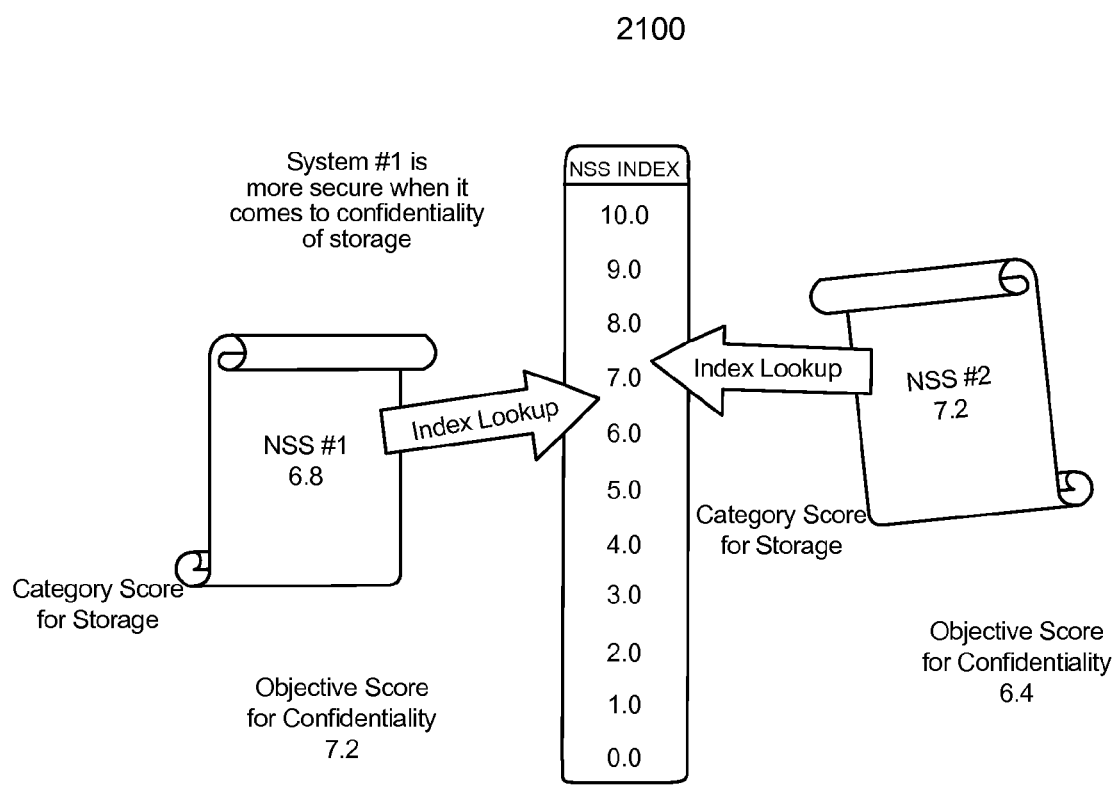
FIG. 15 is a security comparison according to an embodiment of the invention.

In the example of FIG. 15, is a security comparison 2100 according to an embodiment of the invention, wherein two different systems are being compared. System #1 has a lower NSS score than system #2, but system #1 has a higher category score for confidentiality of storage than system #2. Comparisons such as these may be used to determine which product to buy (e.g., which product best meets a user's security needs), or to determine which systems should be upgraded first, or to inform other decisions about system security.

Figure 16:
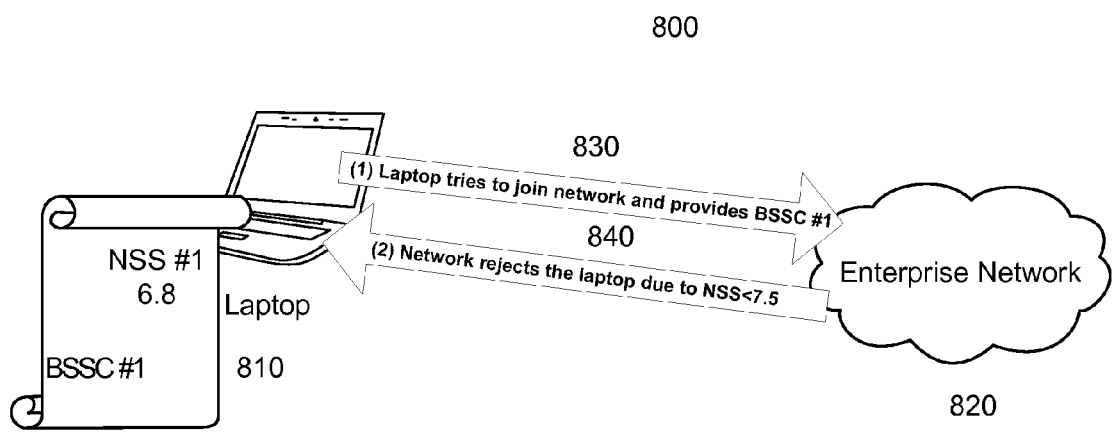
FIG. 16 is a security verification according to an embodiment of the invention.
Figure 17:
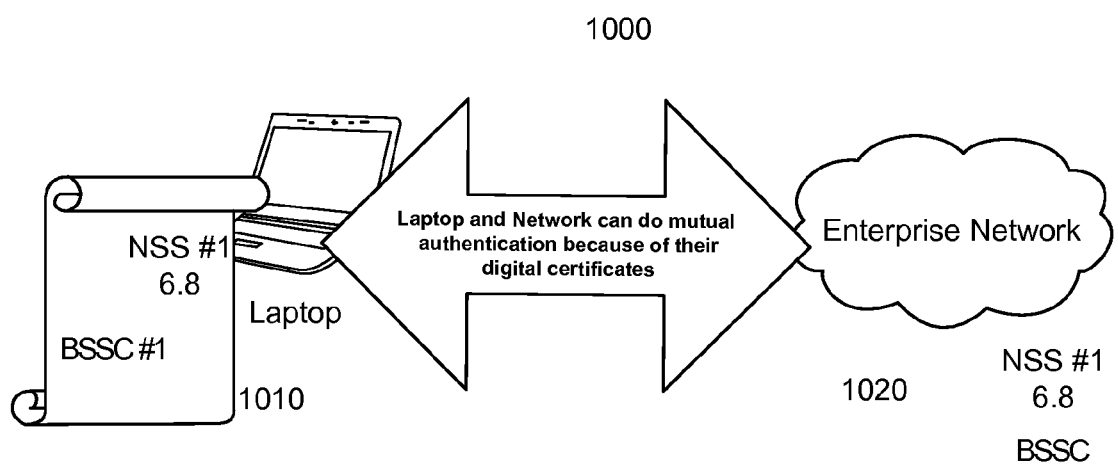
FIG. 17 is a mutual security verification according to an embodiment of the invention.

FIG. 16 is a security verification 800 according to an embodiment of the invention, wherein a BSSC of an asset (laptop 810) may be used for interaction with an enterprise network 820. The asset 810 may attempt to join the network 820 and may provide the BSSC 830. The network 820 may evaluate the BSSC and decide whether the asset 810 is secure 840. In this example, the asset 810 has an NSS in its BSSC that is below a threshold required by the network 820, so the network 820 denies access to the asset 810.

The SOS may provide a probabilistic based evaluation determined by computing security metrics which may describe the probability of a compromise. This probabilistic equation may be expressed as SOS=P(Compromise|Security Measures≠Threats). The SOS is the probabilistic likelihood of a compromise of the asset due to the implemented security measures not safeguarding against threats, where threats are a probabilistic expression over time that an actor with a given motivation may utilize an exploit. Threats=P (Time|Actor|Motivation|Exploit).

Time may be pulled out and carried in the BSSC, represented as the ROD, to allow the SOS to be a set of values. The ROD may indicate how sensitive the SOS is to time exposure. A higher ROD may indicate that the threat against the asset increases more over time than a ROD that is lower.

For example, a NSS may have a range of 0 to 10, with zero being no security and 10 being completely secure. If a given asset has a shelf life (or time until a patch or update is required) of 770 days and no other factors contribute to reducing or extending this shelf life, one way of calculating the ROD may be by taking the maximum NSS value of 10 and dividing it by 770 days. ROD=10 (Max NSS value)/ (days until 100% likelihood of compromise)=10/770=0.013/ day. By reducing the calculated NSS by the ROD times the change in time (days), regardless of the security of the system, at the end of the 770 days the score would be zero. In other words, the system may be regarded as unsecure without some action. In practice, there may be some minimal value somewhere above zero at which the system may be considered unsecure, and this value may be represented as the minimum NSS in the SRC.

Another example may involve an ammo bunker at a military installation. The vault door on the bunker may contribute to one component ("$S_1$") of security. Let the vault be rated at a 6 hour penetration level and let the vendor testing indicate a 60% penetration rate for a skilled attacker with unrestricted access after the 6 hour time period increasing by 5% every hour thereafter. Thus, $S_1$ is 0.95 with a ROD step at 6 hours to 0.6 and a steady 0.05 decay per hour after that. With this clearly spelled out in the vault's BSS, the commander may order a guard to roam past the bunker every 3 hours (essentially resetting the ROD for the door). These two factors together may contribute a $S_1$ for the door of a consistent 0.95.

The SRC may specify which signatories are recognized and accepted by a resource when evaluating the BSSC of an asset looking to gain access to the resource. This may protect the resource against an attempt to falsify security scores by generating a BSSC signed by an unauthorized signatory. In addition, the ability to specify trusted signatories may allow for variation in the security metrics used and the evaluation scale for NSS. For example, security metrics may be based on the Sandia RAM series evaluations and the specification of such may allow a conversion from the Sandia RAM series evaluations to the NSS in a range from 0-100. Likewise, another embodiment may use the CARVER methodology or some pair-wise comparison evaluation and may use a QSM 0-10 scale. Similarly, an embodiment can utilize proprietary metrics and a scale of 0.00 to 1.00. Any and all of the above combinations may be utilized in the evaluation of a complex system, the NSS and QSM methodology may allow for their inclusion. QSM may take known shortcomings in methodologies into account by increasing the rate of decay and reducing the NSS due to the uncertainty of the metrics. Thus, existing systems and evaluations may be leveraged in the short term until a valid QSM evaluation may be performed.

Enhanced authentication and authorization processes between assets may take advantage of the common security measuring and comparison methods described above. This may be done by forcing a real-time evaluation to derive the NSS and objective score set of an asset or utilizing the information stored in BSSC from a past evaluation as well as optionally using the rate-of-decay algorithm of an asset. Additional security rules such as the ones stored in BSSC may also be used as authentication or authorization security criteria. The security level validation may be conducted one-way for one of the assets engaged in the authentication or authorization process, as shown in the example security verifications described above. In some embodiments two-way validation (or all-way validation when two or more assets are trying to authenticate or authorize each other) may be performed, wherein each asset validates the security level of the other. FIG. 16 is a mutual security verification 1000 according to an embodiment of the invention. In this example, the laptop 1010 may validate the BSSC of the enterprise network 1020, and the enterprise network 1020 may validate the BSSC of the laptop 1010, and each asset may separately decide whether the other has a high enough security to permit interaction.

Figure 18:
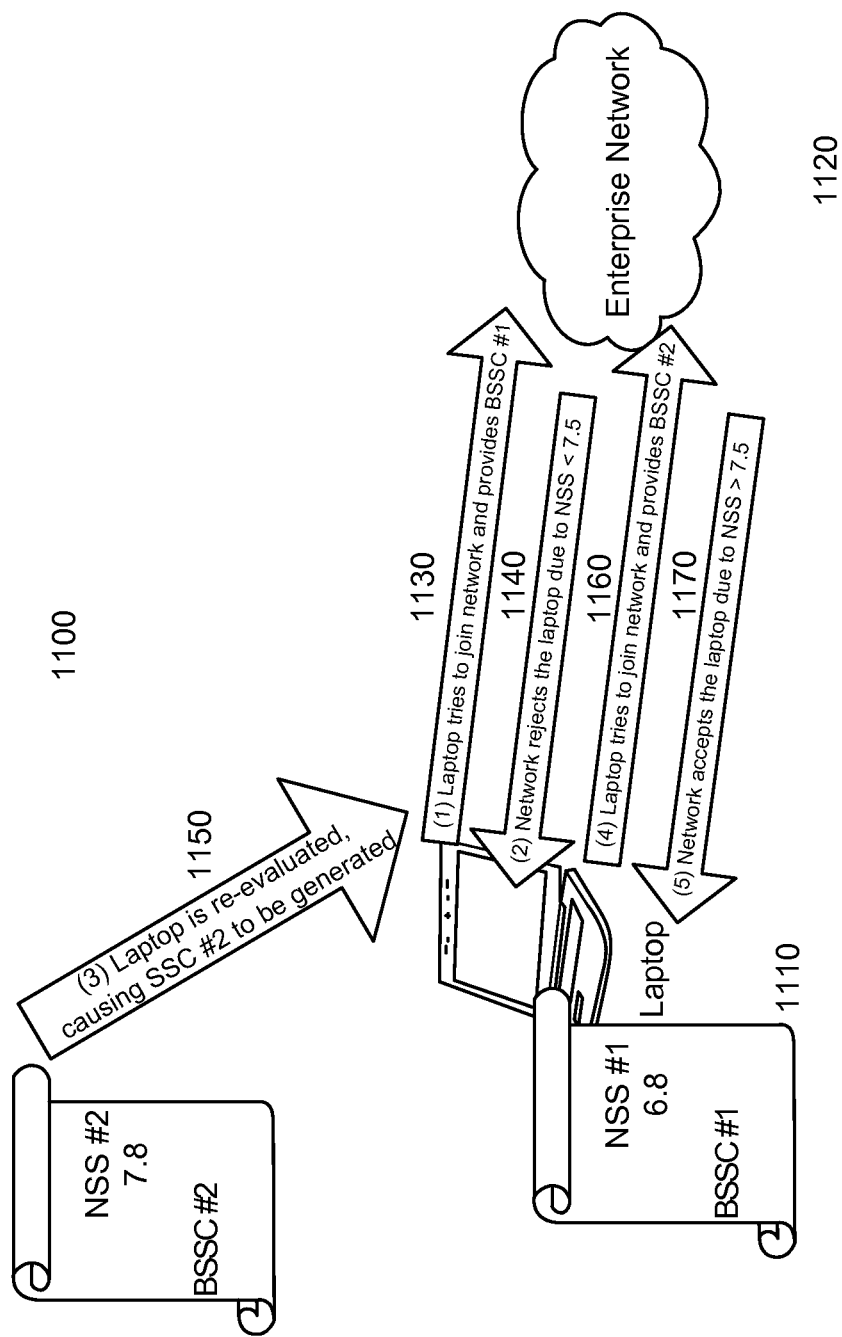
FIG. 18 is a security verification according to an embodiment of the invention.

In some embodiments, a security rule enforcement during the verification process may prompt a reevaluation of one or more of the assets participating in an authentication or authorization. FIG. 18 is a security verification 1100 according to an embodiment of the invention. A BSSC of an asset (laptop 1110) may be used for interaction with an enterprise network 1120. The asset 1110 may attempt to join the network 1120 and may provide its BSSC 1130. The network 1120 may evaluate the BSSC and decide that the asset 1110 is not secure 1140. In this example, the asset 1110 has an NSS in its BSSC that is below a threshold required by the network 1120, so the network 1120 denies access to the asset 1110. The asset 1110 may be reevaluated by the security module 100 in response 1150. As noted above, NSS values may degrade over time. Furthermore, new security features may be implemented on an asset over time. Thus, the reevaluation 1150 may generate a new NSS value for the updated BSSC. In this example, the new value indicates that the asset 1110 is secure enough to interact with the network 1120. The asset 1110 may make a second attempt to join the network 1120 and may provide its updated BSSC 1160. The network 1120 may evaluate the BSSC and decide that the asset 1110 is secure 1170.

QSM evaluation of devices with built-in processing power, such as servers, PCs, and routers may be performed automatically. This may be accomplished by running a QSM process that utilizes a combination of backend databases, scans of configuration information on the computer, and/or automated penetration-testing tools to generate a NSS. This may allow a service provider or network to require at least a minimal security posture for devices that wish to connect to their services that may not have undergone a full QSM evaluation.

This automation may be taken a step further to preemptively protect QSM devices. If a new exploit or other threat is identified, a backend database may search for registered devices that are susceptible and take preemptive action. This action may be to lower their NSS, revoke their cert, and/or advise the asset owner that they should disable a particular service or install a patch or update or advise the system administrator of the threat, for example. Due to the nature of many computer networks, these preemptive services may require periodic communication between the devices and the backend services in some embodiments.

Automated evaluation and certificate generation may also allow for real-time evaluations to be performed for access to systems that may have a particularly high security requirement where a certificate that is even a few days old may not be acceptable, for example. These high security systems may require a certificate that is current (e.g., that day, that week, etc.). This may be handled automatically in some embodiments. An automated QSM evaluation process may allow systems to require reevaluation and recertification at every request to utilize system resources in some embodiments.

The following additional examples illustrate scenarios wherein the QSM may be used for authentication and/or authorization. For the purposes of this section, it may be assumed that devices within the QSM have an SSC. Devices or systems that have their own computing resources may also be assumed to have an SRC. An example of a device which may not have an SRC is a USB memory stick. Since many USB memory sticks do not have their own computing resources, they may be unable to compare their SRC to an SSC they receive, so there may be no reason for them to have an SRC. In addition, the SSC for a device without its own computing resource may simply be the BSSC since the device cannot update the SSC from the BSSC.

Devices using QSM may leverage the SSC in order to perform device authentication and authorize network access. This authentication and authorization may be mutual, allowing for each entity to authenticate and authorize the other, as described above. Utilizing an automated QSM evaluation tool, this mutual authentication may be expanded to external devices that may require temporary or occasional access to network resources, such as joining a Wi-Fi access point at a corporate office, accessing an online merchant, etc. A resource owner may not be able to require a physical assessment of every device that may require occasional access to their resources, where requiring the download or access of a QSM evaluation tool as part of the registration or signup process may be feasible. The QSM tool may then generate an automated BSSC based on an automated scan as discussed above, and then the device may participate in a mutual authentication exchange prior to being granted access to network resources.

Figure 19:
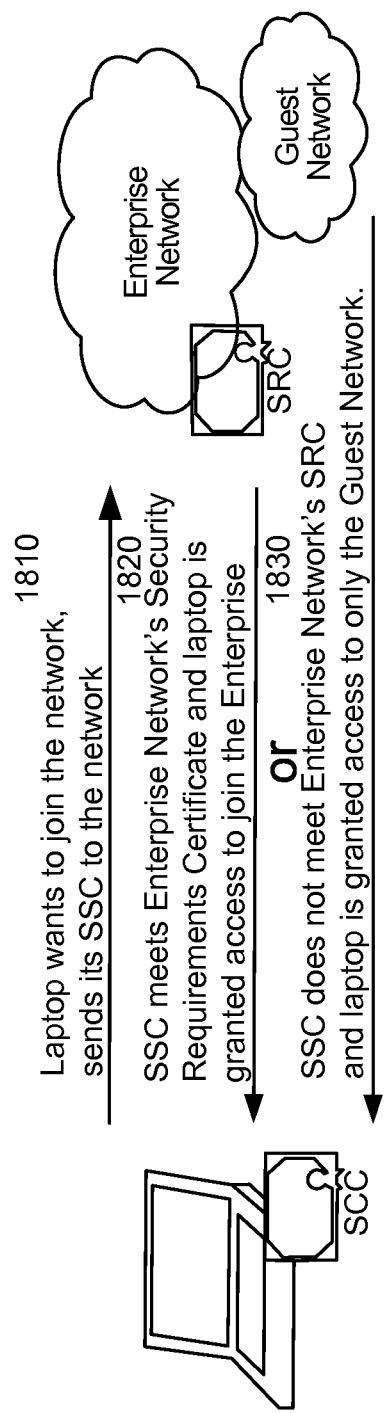
FIG. 19 is a security verification according to an embodiment of the invention.

FIG. 19 is a security verification 1800 according to an embodiment of the invention. Upon connecting to a network, a device can provide the network with its SSC 1810. Since the SSC is a cryptographically signed certificate, the SSC may be unique to the device. As a result, it may be leveraged for authenticating the device (rather than a user) to the network. The network can leverage the SSC for logging purposes to identify any device that may be behaving in a malicious or suspicious manner. A network administrator can leverage the SSC to decide whether or not the device is permitted to join the network based on the device's current security level in some embodiments. Devices meeting the requirements may be allowed to join the network 1820. Besides simply granting or not granting access, the SSC may be leveraged to determine which network segments the device is authorized to access. For example, a device failing to meet an enterprise's security requirements may be placed on a guest network, allowing the device to access the Internet while preventing access to enterprise resources 1830.

Figure 20:
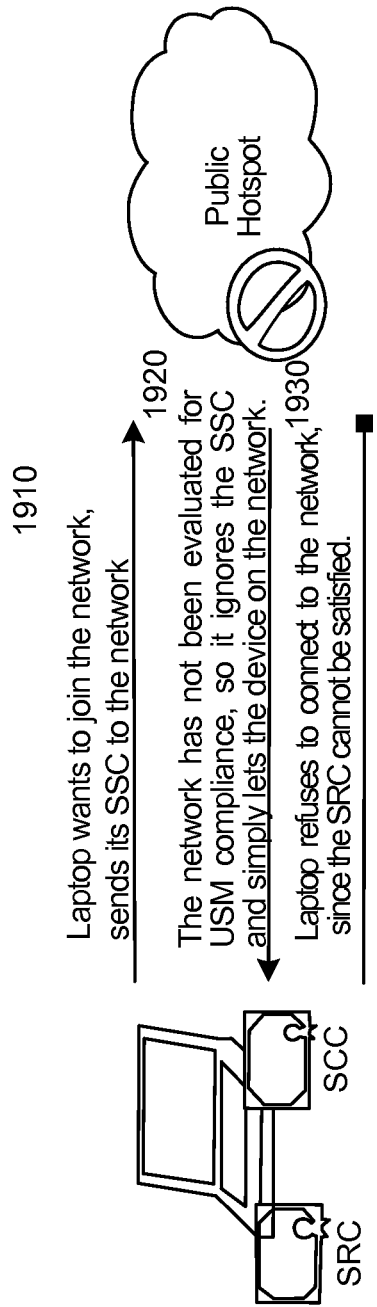
FIG. 20 is a security verification according to an embodiment of the invention.

FIG. 20 is a security verification 1900 according to an embodiment of the invention. Devices can also leverage the SSC in order to authenticate and authorize the network itself. Since networks themselves may have cryptographically signed SSCs, the device may be able to identify the network it is attempting to join. This methodology could eliminate the possibility of network spoofing, whether wired, wireless, or cellular. Users and/or system administrators can leverage the SSC in order to limit which networks the device will use. For instance, an enterprise administrator could configure laptops so they can only connect to the enterprise network, a designated telecommuting router at the employee's house, and a designated cellular network. Employees may be unable to connect their device to any other network. In this example, the laptop may send its SSC to a network 1910. The network may ignore the SSC if it is not evaluated for NSS compliance 1920. In this case, the laptop may refuse to connect to the network, because the SRC is not satisfied 1930.

Furthermore, since the SSC may be updated occasionally, system administrators may permit devices to join less secure networks. The device's SSC may be updated to indicate which insecure network it had joined. Due to the resulting decrease in the SSC, the enterprise network may force the device to be re-evaluated before allowing it to re-join the network. For example, such techniques may be useful when employees travel with their laptops. In addition, users or system administrators may leverage the SSC of the network to authorize which device resources a network may be allowed to access. For example, the device's firewall may prevent networks not meeting certain security levels from being permitted to access file shares or web servers running on the device.

Figure 21:
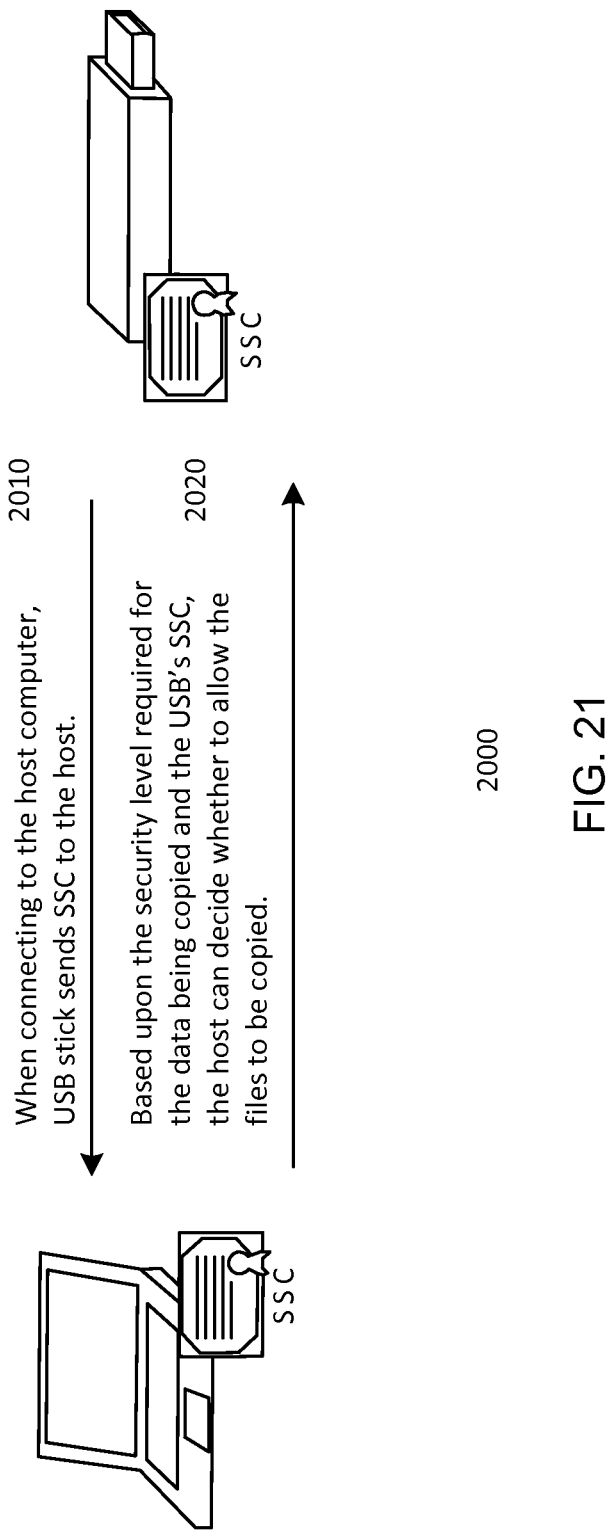
FIG. 21 is a security verification according to an embodiment of the invention.

FIG. 21 is a security verification 2000 according to an embodiment of the invention. Besides authenticating and authorizing networks, a computer may authenticate and authorize devices based upon their SSC. For example, a USB storage device may contain an SSC and send the SSC to the computer when connecting to the computer 2010. If the SSC does not meet certain criteria (e.g. does not adequately encrypt data at rest), the host computer may prevent a user from copying information to the USB stick 2020. Furthermore, if the host computer can detect the nature of the data being copied, the decision 2020 on whether or not to allow the copy to occur may be based on a combination of the data itself and the SSC of the destination device. Similar examples could exist for many other types of devices. In some embodiments, the handshaking between devices may be modified in order to ensure the SSCs are always transmitted. For example, as part of the USB handshaking protocol, both the host and slave devices may share their SSC. This may allow the devices to perform mutual authentication and authorization.

Devices may also utilize the SSC for allowing access to sensitive information on the device itself. For example, a device with a trusted computing space may be configured to only grant access to encrypted information on the device if the SSC meets certain criteria. The trusted computing processor may detect an attempt to access an encrypted volume and then determine whether the current SSC meets the criteria for that encrypted volume. Even if the user knows the decryption keys, the device may prevent them from decrypting the information because the device (which may have been compromised) is no longer trusted. This may enable specially designed computing devices that leverage separate components for sensitive storage, which may require an SSC to comply with a SRC. Essentially, the sensitive storage component may be seen by the system as a separate device.

Hardware and software products may utilize a user provided SRC and desired SSC (within an available range) to automatically configure parameters and settings to establish SOSs to ensure compliance. Removing the burden from the user to determine what combination of parameters available in the product configuration may provide functionality and security. Likewise, resource owners may require certain services or devices to be disabled or stopped while accessing their resources. Leveraging both the auto configuration and QSM auto evaluation processes may allow for this type of dynamic configuration to match security requirements.

SSC may provide product purchasing information. A product manufacturer may provide the SSC for a product online, allowing for consumers to perform a direct comparison between products in their particular security environment. Similarly, web sites could allow potential consumers to submit an SRC in order to learn what products meet their security requirements. This may allow consumers to judge which product produces the desired security enhancement or performance prior to making the purchase. It may even be possible to develop systems to run simulations of systems in order to learn how implementing new products or configurations may impact overall security. Manufacturers may be able to quantify the amount of security they can provide to a user, and show how much security they will add over their competitors for a given security SRC.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A security evaluation method comprising:
receiving, with a processor of a security module including the processor and physical memory, a breakdown of a system whose security is being evaluated into a plurality of components;
evaluating, with the processor, each of the components of the system being evaluated to ascribe a security score to each of the components, the evaluating comprising, for each of the components:
evaluating the component to determine whether it can be divided into a plurality of subcomponents;
in response to determining the component can be divided into a plurality of subcomponents, ascribing a subcomponent security score to each of the subcomponents and generating the security score for the component based on each subcomponent security score; and
in response to determining the component cannot be divided into a plurality of subcomponents, ascribing the security score to the component;
generating, with the processor, a composite security score for the system being evaluated based on each of the security scores;
generating, with the processor, a rate of decay measure characterizing a probabilistic security degradation of the system being evaluated;
applying, with the processor, the rate of decay measure to the composite security score to obtain a current composite security score; and
supplying, with the processor, the current composite security score.

2. The method of claim 1, wherein the rate of decay measure is based on expected interactions between the system and other systems of varying levels of security.

3. The method of claim 1, wherein the rate of decay comprises an associated expiration date.

4. The method of claim 1, further comprising:
comparing, with the processor, the current composite security score to a security requirement to determine whether the current composite security score satisfies the security requirement;
when the current composite security score satisfies the security requirement, permitting, with the processor, the system to perform a task associated with the security requirement; and
when the current composite security score does not satisfy the security requirement, preventing, with the processor, the system from performing the task associated with the security requirement.

5. The method of claim 1, wherein:
the composite security score is generated by calculating a normalized security score equal to the product of a security rate of decay and a time factor subtracted from the product of a base security score multiplied by a security requirement weighting;
the base security score is calculated from multiple security category scores; and
the security requirement weighting is calculated from multiple security objective scores.

6. The method of claim 1, further comprising supplying, with the processor, a comparison of the current composite security score to a security rating index.

7. The method of claim 6, further comprising producing, with the processor, one or more indicia of acceptable security for the system based on the comparison of the current composite security score to the security rating index.

8. The method of claim 1, further comprising receiving, with the processor, a security requirements certificate for the system comprising at least one security requirement.

9. The method of claim 8, further comprising comparing, with the processor, the current composite security score to the security requirements certificate to determine whether the system meets the at least one security requirement.

10. The method of claim 1, further comprising receiving, with the processor, a base security score certificate for the system comprising at least one access requirement.

11. The method of claim 10, further comprising comparing, with the processor, the current composite security score to the base security score certificate to determine whether the system meets the at least one access requirement.

12. The method of claim 1, wherein:
each component and subcomponent comprises an agreed upon, reproducible, independently verifiable, security level determination.

13. The method of claim 12, wherein each security level determination comprises a security objective score component.

14. The method of claim 12, wherein each security level determination comprises a security category weighting component.

15. A security evaluation system comprising:
a security module including a processor and physical memory, the processor constructed and arranged to:
receive a breakdown of a system whose security is being evaluated into a plurality of components;
evaluate each of the components of the system being evaluated to ascribe a security score to each of the components by a process comprising, for each of the components:
evaluating the component to determine whether it can be divided into a plurality of subcomponents;
in response to determining the component can be divided into a plurality of subcomponents, ascribing a subcomponent security score to each of the subcomponents and generating the security score for the component based on each subcomponent security score; and
in response to determining the component cannot be divided into a plurality of subcomponents, ascribing the security score to the component;
generate a composite security score for the system being evaluated based on each of the security scores;
generate a rate of decay measure characterizing a probabilistic security degradation of the system being evaluated;
apply the rate of decay measure to the composite security score to obtain a current composite security score; and
supply the current composite security score.

16. The system of claim 15, wherein the rate of decay measure is based on expected interactions between the system and other systems of varying levels of security.

17. The system of claim 15, wherein the rate of decay comprises an associated expiration date.

18. The system of claim 15, wherein the processor is further constructed and arranged to:
compare the current composite security score to a security requirement to determine whether the current composite security score satisfies the security requirement;
when the current composite security score satisfies the security requirement, permit the system to perform a task associated with the security requirement; and when the current composite security score does not satisfy the security requirement, prevent the system from performing the task associated with the security requirement.

19. The system of claim 15, wherein:
the composite security score is generated by calculating a normalized security score equal to the product of a security rate of decay and a time factor subtracted from the product of a base security score multiplied by a security requirement weighting;
the base security score is calculated from multiple security category scores; and
the security requirement weighting is calculated from multiple security objective scores.

20. The system of claim 15, wherein the processor is further constructed and arranged to supply a comparison of the current composite security score to a security rating index.

21. The system of claim 20, wherein the processor is further constructed and arranged to produce one or more indicia of acceptable security for the system based on the comparison of the current composite security score to the security rating index.

22. The system of claim 15, wherein the processor is further constructed and arranged to receive a security requirements certificate for the system comprising at least one security requirement.

23. The system of claim 22, wherein the processor is further constructed and arranged to compare the current composite security score to the security requirements certificate to determine whether the system meets the at least one security requirement.

24. The system of claim 15, wherein the processor is further constructed and arranged to receive a base security score certificate for the system comprising at least one access requirement.

25. The system of claim 24, wherein the processor is further constructed and arranged to compare the current composite security score to the base security score certificate to determine whether the system meets the at least one access requirement.

26. The system of claim 15, wherein:
each component and subcomponent comprises an agreed upon, reproducible, independently verifiable, security level determination.

27. The system of claim 26, wherein each security level determination comprises a security objective score component.

28. The system of claim 26, wherein each security level determination comprises a security category weighting component.

29. A security evaluation method comprising:
receiving a breakdown of a system whose security is being evaluated into a plurality of components;
evaluating each of the components to ascribe a security score to each of the components of the system being evaluated, the evaluating comprising, for each of the components:
evaluating the component to determine whether it can be divided into a plurality of subcomponents;
in response to determining the component can be divided into a plurality of subcomponents, ascribing a subcomponent security score to each of the subcomponents and generating the security score for the component based on each subcomponent security score; and
in response to determining the component cannot be divided into a plurality of subcomponents, ascribing the security score to the component;
generating a composite security score for the system being evaluated based on each of the security scores;
generating a rate of decay measure characterizing a probabilistic security degradation of the system being evaluated;
applying the rate of decay measure to the composite security score to obtain a current composite security score; and
supplying the current composite security score.

30. The method of claim 29, wherein the rate of decay measure is based on expected interactions between the system and other systems of varying levels of security.

31. The method of claim 29, wherein the rate of decay comprises an associated expiration date.

32. The method of claim 29, further comprising:
comparing the current composite security score to a security requirement to determine whether the current composite security score satisfies the security requirement;
when the current composite security score satisfies the security requirement, permitting the system to perform a task associated with the security requirement; and
when the current composite security score does not satisfy the security requirement, preventing the system from performing the task associated with the security requirement.

33. The method of claim 29, wherein:
the composite security score is generated by calculating a normalized security score equal to the product of a security rate of decay and a time factor subtracted from the product of a base security score multiplied by a security requirement weighting;
the base security score is calculated from multiple security category scores; and
the security requirement weighting is calculated from multiple security objective scores.

34. The method of claim 29, further comprising supplying a comparison of the current composite security score to a security rating index.

35. The method of claim 34, further comprising producing one or more indicia of acceptable security for the system based on the comparison of the current composite security score to the security rating index.

36. The method of claim 29, further comprising receiving at least one security requirement certificate for the system.

37. The method of claim 36, further comprising comparing the current composite security score to the at least one security requirement to determine whether the system meets the at least one security requirement.

38. The method of claim 29, further comprising receiving at least one access requirement for the system.

39. The method of claim 38, further comprising comparing the current composite security score to the at least one access requirement to determine whether the system meets the at least one access requirement.

40. The method of claim 29, wherein:
each component and subcomponent comprises an agreed upon, reproducible, independently verifiable, security level determination.

41. The method of claim 40, wherein each security level determination comprises a security objective score component.

42. The method of claim 40, wherein each security level determination comprises a security category weighting component.

\* \* \* \* \*